US008554176B2

(12) United States Patent
McLean

(10) Patent No.: US 8,554,176 B2
(45) Date of Patent: Oct. 8, 2013

(54) METHOD AND APPARATUS FOR CREATING A REMOTELY ACTIVATED SECURE BACKUP SERVICE FOR MOBILE HANDSETS

(75) Inventor: Ivan H. McLean, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1373 days.

(21) Appl. No.: 11/857,383

(22) Filed: Sep. 18, 2007

(65) Prior Publication Data

US 2009/0075630 A1    Mar. 19, 2009

(51) Int. Cl.
H04M 1/66    (2006.01)

(52) U.S. Cl.
USPC ............... 455/411; 455/410; 455/550.1

(58) Field of Classification Search
USPC ..................... 455/411, 410, 550.1
See application file for complete search history.

(56) References Cited

U.S. PATENT DOCUMENTS

| 6,430,170 | B1 * | 8/2002 | Saints et al. | 370/335 |
|---|---|---|---|---|
| 6,453,159 | B1 | 9/2002 | Lewis | |
| 7,159,120 | B2 | 1/2007 | Muratov et al. | |
| 2003/0040298 | A1 * | 2/2003 | Heatley | 455/411 |
| 2003/0078032 | A1 | 4/2003 | Pei et al. | |
| 2005/0191988 | A1 * | 9/2005 | Thornton et al. | 455/404.1 |
| 2007/0190977 | A1 * | 8/2007 | Fok et al. | 455/411 |
| 2007/0294529 | A1 * | 12/2007 | Blair et al. | 713/160 |
| 2007/0297610 | A1 * | 12/2007 | Chen et al. | 380/270 |
| 2008/0089254 | A1 * | 4/2008 | Graves et al. | 370/310 |
| 2008/0310633 | A1 * | 12/2008 | Brown et al. | 380/259 |

FOREIGN PATENT DOCUMENTS

| EP | 1501330 | | 1/2005 |
|---|---|---|---|
| JP | 08272742 | | 10/1996 |
| JP | 2003529235 | A | 9/2003 |
| JP | 2007214767 | A | 8/2007 |
| WO | 00045243 | | 8/2000 |
| WO | 2006054340 | A1 | 5/2006 |
| WO | 2006125112 | A2 | 11/2006 |

OTHER PUBLICATIONS

Annex to International Search Report—PCT/US08/078404—International Search Authority—European Patent Office—Dec. 16, 2008.
Partial European Search Report—EP08102982, Search Authority, Munich Patent Office.
International Search Report and Written Opinion—PCT/US2008/076404, International Search Authority—European Patent Office—Feb. 11, 2009.
European Search Report—EP08102982 Search Authority—Munich Patent Office, Apr. 12, 2008.

* cited by examiner

Primary Examiner — Manpreet Matharu
(74) Attorney, Agent, or Firm — James T. Hagler

(57) ABSTRACT

Method and systems for protecting data on a mobile handset when remotely activated by a user involve encrypting the data using an encryption key, storing the encrypted data, and deleting the non-encrypted data along with the encryption key. Data may also be uploaded to a server to via a cellular data call for use in backing up the mobile handset. A mobile handset application configures the handset to receive activation commands from a server to encrypt, upload or download data. The encryption key is either received from the server or generated by the mobile handset and communicated to the server. Mock data files may be generated and stored on the mobile handset to enable handset applications to function normally after the data files have been encrypted.

8 Claims, 20 Drawing Sheets

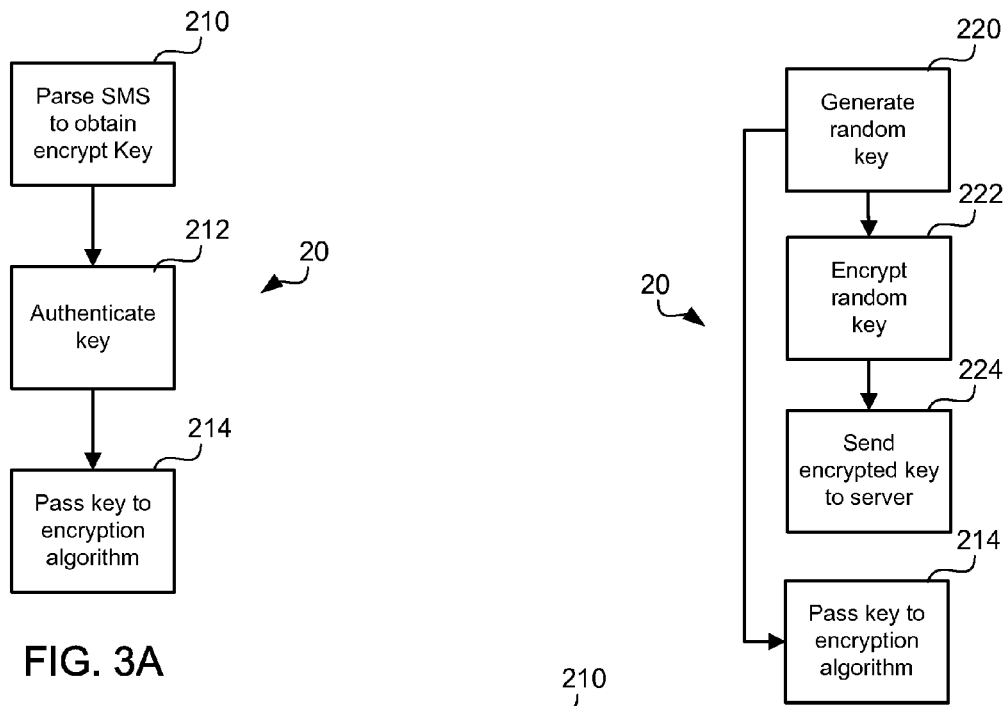
FIG. 3A
FIG. 3B
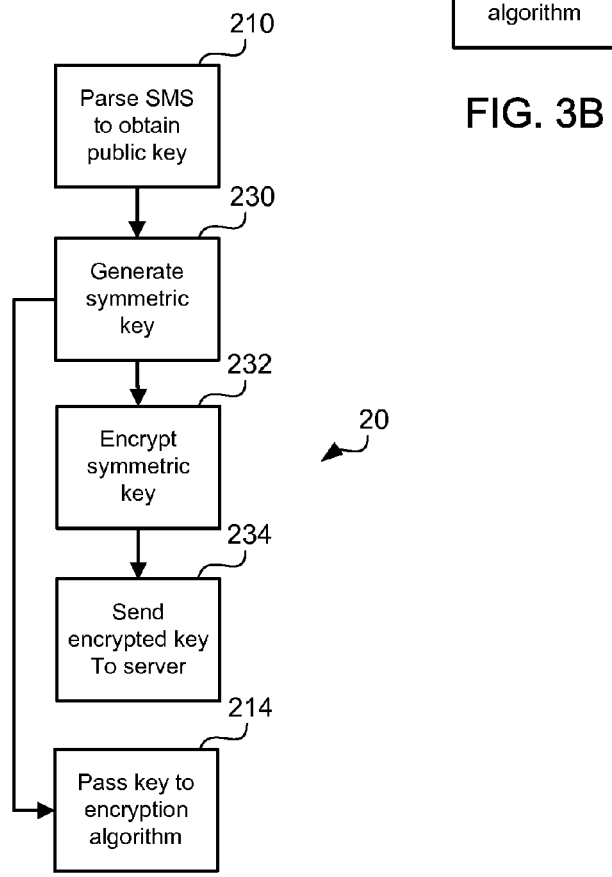
FIG. 3C

METHOD AND APPARATUS FOR CREATING A REMOTELY ACTIVATED SECURE BACKUP SERVICE FOR MOBILE HANDSETS

FIELD OF THE INVENTION

The present invention relates to methods for securing and backing up data files stored on a mobile handset.

BACKGROUND

With the ever expanding capabilities and applications for cellular phones and other mobile handsets, users are increasingly saving personal and business data on their mobile handsets. While maintaining such data on a mobile handset can make a user's life easier, mobile handsets are vulnerable to being lost or stolen which can result in loss of the data as well the potential disclosure to others. Consequently, there is a need to maintain backup files of data stored on mobile handsets. Many mobile handsets provide applications and mechanisms for backing of files to a personal computer. However, such utilities are only helpful if users routinely backup their data, and too often it is the loss of a mobile handset that reminds users of the need to perform regular backups. Moreover, backing up data stored on mobile handsets does nothing to protect the data from being misappropriated by someone who steals or finds the mobile handset.

Data in a mobile handset can be protected from unauthorized use by maintaining the data in encrypted format and only decrypting data as it is needed by the user or an application. However, decrypting data each time it is accessed can be time consuming and, to be practical, may require greater processing and memory capability than is generally available on mobile handsets. Consequently, data is rarely encrypted on mobile handsets.

SUMMARY

The various embodiments provide mechanisms that enable users to protect data stored on mobile handsets by remotely activating an encryption application that encrypts all or selected data and then deletes the encryption key from the mobile handset memory. Some embodiments also upload copies of the data to a server via a cellular data call or other wireless data transmission. Sending data files to a server provides a backup of the data stored on the mobile handset. Mechanisms and functionality are provided to enable users to remotely activate the data encryption and backup functions using a variety of communication devices. A mobile handset application configures the mobile handset to receive notification from a server to encrypt data. An encryption key is either received from the server or generated by the mobile handset and communicated to the server. All or selected files on the mobile handset are renamed and then encrypted. Mock data files or templates may be generated and stored on the mobile handset in order to enable handset applications to function normally.

In the various embodiments, a server is configured to authenticate users, provide users with a menu interface for selecting various encryption and backup data services for registered mobile handsets, generate and transmit activation command messages to mobile handsets, and receive encrypted files from mobile handsets. The server may be further configured to restore files to mobile handsets by transmitting the files via a wireless network, such as the cellular telephone network.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

FIGS. 3A-3C are process flow diagrams of a portion of the process illustrated in FIG. 1 related to obtaining an encryption key.

DETAILED DESCRIPTION

Figure 1:
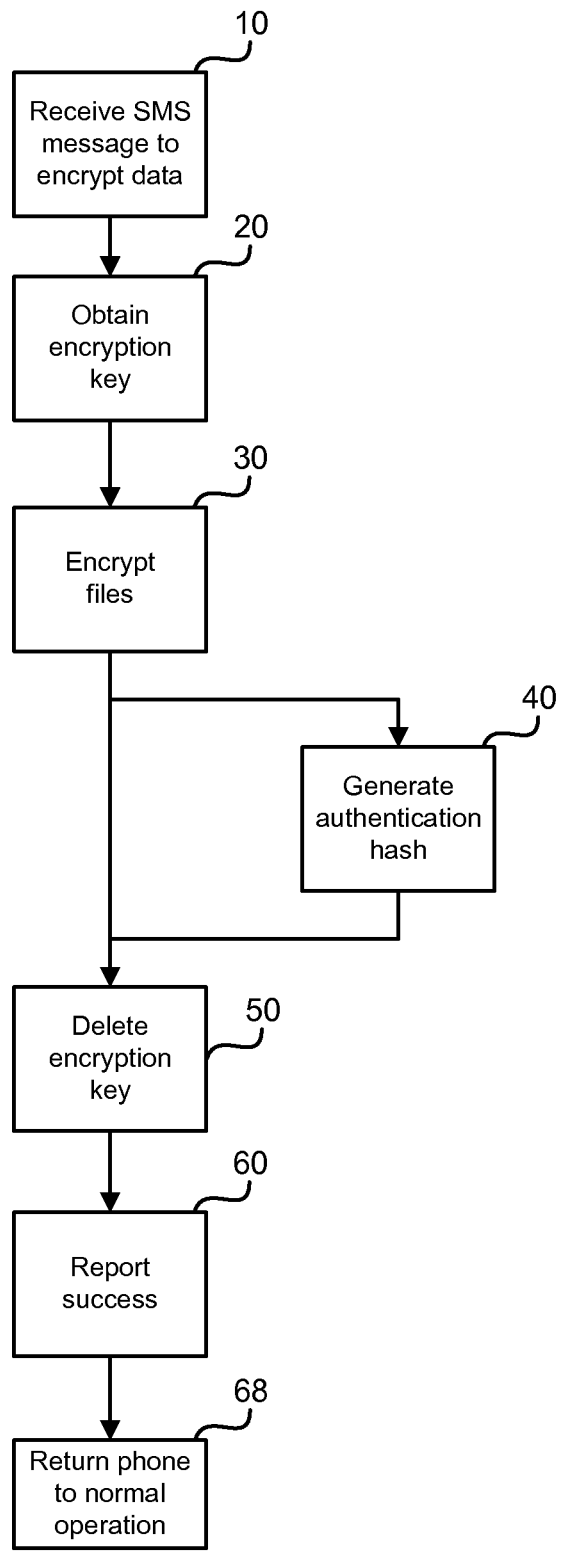
FIG. 1 is a process flow diagram of the overall process involved in an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Recently, the processing and data storage capabilities of small portable mobile handsets have increased their popularity and usage. Mobile handsets include for example, cellular telephones, personal digital assistants (PDAs) with wireless modems, wireless electronic mail receivers (e.g., the Blackberry® and Treo® devices), and multimedia Internet enabled cellular telephones (e.g., the iPhone®). While the size and portability of mobile handsets make them handy, these characteristics also make them easily lost or stolen. Often, users are not aware that their mobile handset is missing until the next time they need to look up data or place a telephone call. Users may believe their mobile handset is merely misplaced when it has been stolen. Other times users may presume that their mobile handset was lost when it has merely been misplaced. Consequently, methods for protecting data stored on mobile handsets need to accommodate the nature of such devices and the way users treat them.

If a mobile handset is stolen, a user may have very little time to act before the thief begins to access and misappropriate data stored on the device. Additionally, data protection processes should not be obvious, lest they tip off a thief to take measures to defeat the processes, such as by removing the batteries from the mobile handset.

One method for protecting data from misappropriation is to send a message to the mobile handset to delete all personal data stored in memory. Data is typically maintained in mobile handset devices on nonvolatile or flash memory chips. Therefore, to delete data, new data needs to be written into the same memory address locations. Methods for sanitizing nonvolatile memory have been proposed, an example of which is disclosed in U.S. Pat. No. 7,089,350, which is hereby incorporated by reference.

However, deleting all data on the mobile handset represents an extreme measure involving the permanent loss of valuable personal data, which users may be reluctant to implement if they believe there is a possibility the mobile handset will be found or recovered. Consequently, such methods may not be implemented by users in time to prevent others from accessing the data stored on the mobile handset. Further, if such methods are implemented, users lose all of the data stored on the mobile handset, even if the handset is subsequently found or recovered.

The various embodiments of the present invention provide systems and methods that enable users to remotely secure data on their mobile handsets in a manner that permits the data to be recovered if the handset is subsequently found, recovered or replaced. When initiated, the various embodiments encrypt selected data files so that the data cannot be accessed without a decryption key, and then the encryption key is deleted from a memory of the mobile handset. This leaves the data files protected and denies thief access to the encryption key that could otherwise be used to decrypt the data files. Being activated by a server that can be programmed to provide a variety of service options and be made accessible via the Internet, the various embodiments provide users with flexible options for remotely managing the mobile handset data protection and recovery process.

The various embodiments involve methods which are implemented in a mobile handset by programming the internal processor with software instructions which cause the processor to accomplish the embodiment process steps and provided the functionality of the various embodiments. Such software instructions are typically stored in nonvolatile memory, such as flash memory or electronically erasable programmable read only memory (EEPROM). To simplify the description of the embodiments, the mobile handset is described as accomplishing the various tasks and process steps, even though it is an internal processor or other internal components that perform the steps in accordance with software instructions.

The various embodiments also make use of wireless data communication links that may be established between a mobile handset and network to enable data communications with a remote server. An example of such a wireless data communication link is a cellular telephone network that permits a mobile handset to connect to the Internet in a data call, and then link to the server using IP data communications (e.g., by accessing the IP address of the server). However, any form of wireless data network may be used, including, for example, WiFi networks, Bluetooth networks, local area wireless networks, and satellite communication links, such as may be the case where the mobile handset is a satellite telephone. To simplify the descriptions of the various embodiments, reference is made to the mobile handset accessing a cellular telephone network instead of repeatedly listing all of the alternative wireless networks that could be used. The repeated reference to the cellular telephone network is not intended to be limiting and should not be interpreted as narrowing the scope of this invention or the claims.

FIG. 1 provides an overview of the various embodiment methods implemented on a mobile handset. The process for protecting data files on the mobile handset begins when the device receives an activation command message directing it to encrypt data files, step 10.

In an embodiment, the activation command message is sent as a small message system (SMS) message. SMS is a service for sending messages of up to 160 characters (224 characters if using a 5-bit mode) to mobile handsets over a cellular telephone network. SMS is similar to paging; however, SMS messages do not require the mobile handset to be active. If the mobile handset is turned off or out of range of a cell tower, the SMS message will be held in memory storage for a number of days until the phone is active and within range and the SMS message can be received. A typical SMS message includes a data payload in which brief text data can be provided. This text data can be obtained by parsing the SMS message and interpreting the information provided. In the various embodiments, the SMS payload can include a command to encrypt, backup or recover data. The SMS message payload may also be used to communicate encryption keys to be used in the file protection process. Other types of messaging, including electronic mail, periodic polling of Internet bulletin boards, and data calls from the server to the mobile handset may be used to send the activation command message. In order to simplify the description of the various embodiments, references made to the use of SMS messages for illustrative purposes. However, the scope of the present invention and the claims should not be limited to nor require the use of SMS messages.

When the mobile handset recognizes a received SMS message as directing it to encrypt all or selected data files, the mobile handset obtains an encryption key, step 20, to use for encrypting the data. A variety of mechanisms may be used to provide the encryption key to the mobile handset, some of which are described in more detail below with reference to FIG. 3A-3C.

The mobile handset then encrypts selected data files using the encryption key and any of a number of standard encryption processes, step 30. As explained in further detail below with reference to FIGS. 4 and 5, the encrypted files are saved to memory and the non-encrypted data files deleted As part of encrypting files, the mobile handset may generate an authentication value, such as a hash of the encrypted data file, step 40, which can be used to authenticate the encrypted data file and confirm that the contents of have not been changed. An example of encryption and authentication methods is the keyed-hash message authentication code, or HMAC, which is a type of message authentication code (MAC) calculated using a cryptographic hash function in combination with a secret key. To simplify the descriptions of the various embodiments, reference is made to a MAC included in messages and with data files. However, this usage is for illustrative purposes and is not intended to limit the embodiments or exclude any other form of message and data file authentication and verification techniques.

Once the data files have all been encrypted, the encryption key is deleted from memory, step 50. This deletion may be accomplished for all registers which held the encryption key during the encryption process along with buffer memory associated with the message parsing process. With the encryption key deleted from the handset memory, it will be extremely difficult for anyone to decipher the encrypted data files within a reasonable amount of time.

Once the data files have been secured on the mobile handset through the encryption of data and deletion of the encryption key, the mobile handset may report successful completion of the process, step 60. This may involve sending a simple success message, such as an SMS message directed to the server. Users may be concerned about the security of their data following the loss of a mobile handset, so such completion messages can be important. Therefore, the server may be configured to maintain an up-to-the-minute status of the process and/or promptly inform users when their data has been secured by encryption. Additionally, while not necessary, the mobile handset may upload data files to the server as explained below with reference to FIG. 8. By uploading data files to the server, the information can later be recovered even if the mobile handset is never found. This provides an additional layer of security and convenience to mobile handset owners, and provides users with the incentive of recovering their data to promptly them to activate the system when they first discover that their mobile handset is missing.

Finally, with data secured and backed up to a server, the mobile handset returns to normal operation. Thus, if the mobile handset is found, it can continue to be used even before a data restore operation is completed. Also, by returning to normal operation, a thief is not tipped off that data has been secured or backed up.

The various embodiments also include measures to ensure that the data encryption and backup processes are performed without any obvious indications on the mobile handset that might alert a thief that the data is being secured. These processes may include deactivating SMS message alert tones, deactivating message transmission symbols or status lights, and deactivating any process operation indicators that may appear on the mobile handset display. Additionally, the mobile handset may be configured to communicate with the server only during times of little use, such as after midnight and after extended periods of no usage.

The various embodiments provide users with flexibility in the manner in which data files are protected and/or uploaded to the server for backup purposes. Such flexibility includes the ability to select specific files for encryption and for backup. This allows the user to encrypt only those data files that are indeed private, such as personal phone book and business data, while public and non-confidential data, like photographs, videos, songs, ring tones, wallpapers, and game applications, are not encrypted. Users are also able to select when data will be encrypted and backed up on the server, including the ability to establish periodic backup operations. Additionally, users may activate the data protection capability through a variety of devices that can send a message to the server, such as by using a computer connected to the Internet, by sending an SMS message from another mobile handset, or by calling a voice activated or voice prompt menu service.

These additional features of the various embodiments can be better understood with reference to FIGS. 2 through 18 which illustrate detail process steps that enable the embodiments.

Figure 2:
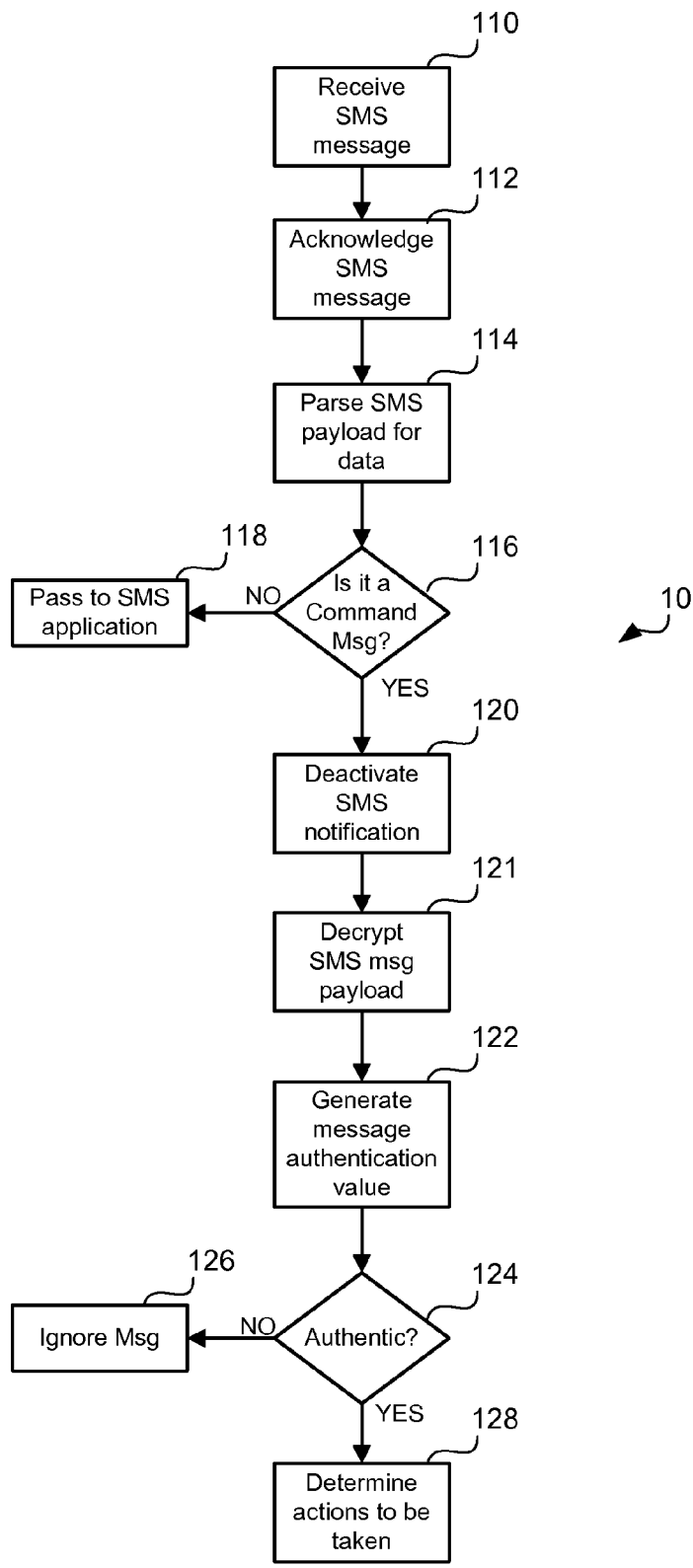
FIG. 2 is a process flow diagram of a portion of the process illustrated in FIG. 1 related to reception of a data encryption message.

FIG. 2 shows an example implementation steps involved in the reception of an SMS message to activate the data encryption process (step 10 of FIG. 1). An SMS message is received by the mobile handset in step 110 just as any other SMS message. In the normal manner, upon successfully receiving the SMS message the mobile handset will return an acknowledgement message, informing the server that the activation command message has been received, step 112. The SMS message is then parsed by the mobile handset to separate the data payload from the header so that the contents of the message can be analyzed, step 114. The contents of the message are evaluated and authenticated/validated to determine if the message contains an activation command, test 116. This test may be accomplished by comparing selected data fields in the message (e.g., the activation command field 2102 illustrated in FIG. 21) to values stored in memory. If an activation command (e.g., indicating one of the encrypt, backup, or recover actions) is not present in the message data, the message is passed to the normal SMS messaging application of the mobile handset, step 118. However, if an activation command is present (in the message data i.e., test 116 is "YES"), the command is executed. At this point, a mobile handset application for encrypting and backing up data files may be activated.

As a first step, the application may configure the mobile handset for the encryption process by deactivating notifications associated with SMS messages, step 120. Normally, when an SMS message is received, the mobile handset will sound a ring tone to inform the user that a message is waiting to be read. However, in the case of an activation command message, it is best not to inform a possible thief that the data encryption program is about to execute. Therefore, the application may deactivate the SMS application, as well as temporarily deactivate ring tones and display options which would signal that an SMS message has been received and is being processed. Additionally, the application may also deactivate symbols and lights which normally indicate that the processor is executing a task, that a data call is in process, or that any activity is underway.

In an embodiment, the process of configuring the mobile handset for the encryption process further includes enabling software to allow the handset to "play dead" in the event the handset is powered off before the data encryption process has concluded. In this mode, if the mobile handset is commanded to turn off by a user pressing a power on/off key or selecting a menu on the mobile handset, the mobile handset will generate the notification tones and generate the displays typical in a shutdown sequence, and then clear the display and turn off all indicator lights to simulate the "off" condition even while the processor continues to operate. In this manner, the mobile handset can continue to complete the encryption and downloading of files to the server without tipping off a thief that such activity is underway. Further, by "playing dead" the mobile handset may lead a thief into believing that there is no need to remove the battery in order to interrupt or prevent the file encryption and backup processes.

In order to protect the system from abuse by unauthorized individuals or malicious attempts to encrypt or remove data on the mobile handset, the activation command sent by the SMS message will generally be encrypted and digitally signed by the server that sends the message. Techniques for digitally signing message packets are well known in the telecommunications arts, and standard methods for including a digital signature and verifying such digital signatures may be used with the various embodiments. Typically, a digital signature is generated by applying a hashing algorithm to the message content using a shared encryption key to produce a hash value referred to as a MAC. Due to the way the MAC is generated, it can be used to simultaneously verify both the data integrity and the authenticity of a message. As explained more fully below, the activation message containing the activation command, and encryption key (in some embodiments), an authentication key, and selected activation options will be encrypted and then digitally signed by including a MAC generated based on the message content and the authentication key sent to the mobile handset. The mobile handset has a decrypted key that enables it to decrypt the received message, thereby recovering the encryption key, the authentication key and the application options. Then using the authentication key, the mobile handset can authenticate and verify the message content using the MAC.

Thus, after receiving the message, the mobile handset decrypts the SMS message payload using a decrypted key known to the handset, step 121. The decrypted message may then be further parsed in order to separate out the activation command, the encryption key (if included), the authentication key, and other option values.

Before the mobile handset takes any actions, it must verify the received activation command by authenticating the message using the included MAC. Depending upon the type of digital signature employed, there are a variety of methods for verifying the signature. For example, the mobile handset can generate a verification MAC using the received message content and a key shared between the mobile handset and the server, step 122. The generated MAC is then compared to the received MAC to determine if the values are the same, test 124. If the values do not match, that indicates either the message is not authentic or it was not accurately received, and on that basis the message will be ignored, step 126. However if the generated and received MAC values match, then the message is both verified and authentic, and the application will act on the message.

As a final step in the process of receiving an activation message, the contents of the message will be examined for parameters that the application can use to carry out its functions. For example, the parameters may specify particular files to be encrypted, whether files are to be downloaded to the server, whether files are to be deleted after they have been downloaded to the server, and other options which users may select via the server. Thus, in step 128, the mobile handset determines the specific actions that are to be taken in carrying out the encryption operation. Coding in the message identifying the specific actions may be in the form of flags (i.e., binary data) or special character bytes that have specific meaning to the application. For example, binary flags may be used to indicate whether files are to be downloaded or not, and deleted or not. Based on the determination made in step 128, flags may be set in memory of the mobile handset to prompt the appropriate functionality later in the process, such as discussed below with reference to FIG. 8.

If the activated process involves either encryption or decryption of data files, the mobile handset must obtain the proper encryption key, step 20. This encryption key may be provided in a number of different ways, three examples of which are illustrated in FIGS. 3A, 3B and 3C.

Referring to FIG. 3A, one method for providing the encryption key to the mobile handset is for the server to include the key within the SMS message data payload. In this method, the SMS message is parsed to obtain the encryption key from the message data payload, step 210. This key then may be authenticated and/or decrypted, step 212, which may be accomplished using any of a number of message authentication techniques well known in the arts, including authenticating the message using the MAC as discussed above. With the encryption key determined and authenticated, it is passed to the encryption algorithm, step 214.

In an alternative embodiment illustrated in FIG. 3B, the mobile handset generates the encryption key and sends it to the server before using it to encrypt the data files. As a first step, the mobile handset generates a random key using any of a number of well known methods for generating random keys, step 220. Before sending this encryption key to the server, it must be encrypted so that it cannot be intercepted and used by third parties who may seek to intercept and decode messages sent from the mobile handset to the server. The random encryption key is encrypted using another encryption key that is shared by the mobile handset and the server, step 222. For example, the server public key may be used to secure the random encryption key prior to transmission to the server. The encrypted random encryption key is then sent back to the server, step 224, so that the server can save it for future use in recovering data files. The generated random key is also passed to the encryption algorithm, step 240, so that the encryption process can begin. As explained below with reference to FIG. 4, the algorithm application may wait to initiate encryption of data files until it receives confirmation that the random encryption key has been successfully received by the server. This avoids a situation that could result if the files are encrypted but the server never receives the encryption key.

A third embodiment for obtaining the encryption key is to use the well known method of public key encryption illustrated in FIG. 3C. In this embodiment, the server holds a secret key and sends a public key to the mobile handset via the SMS message. The mobile handset then creates a random symmetric key which it sends to the server encrypted using the public key. Referring to FIG. 3C, in order to obtain the encryption key in this embodiment, the mobile handset parses the decrypted SMS message payload to obtain the public encryption key, step 210. It then generates a random symmetric key in step 230, which is then encrypted using the public key in step 232 before being sent back to the server, step 234. The generated symmetric key is then passed to the encryption algorithm for use in encrypting the data files, step 214.

Figure 4:
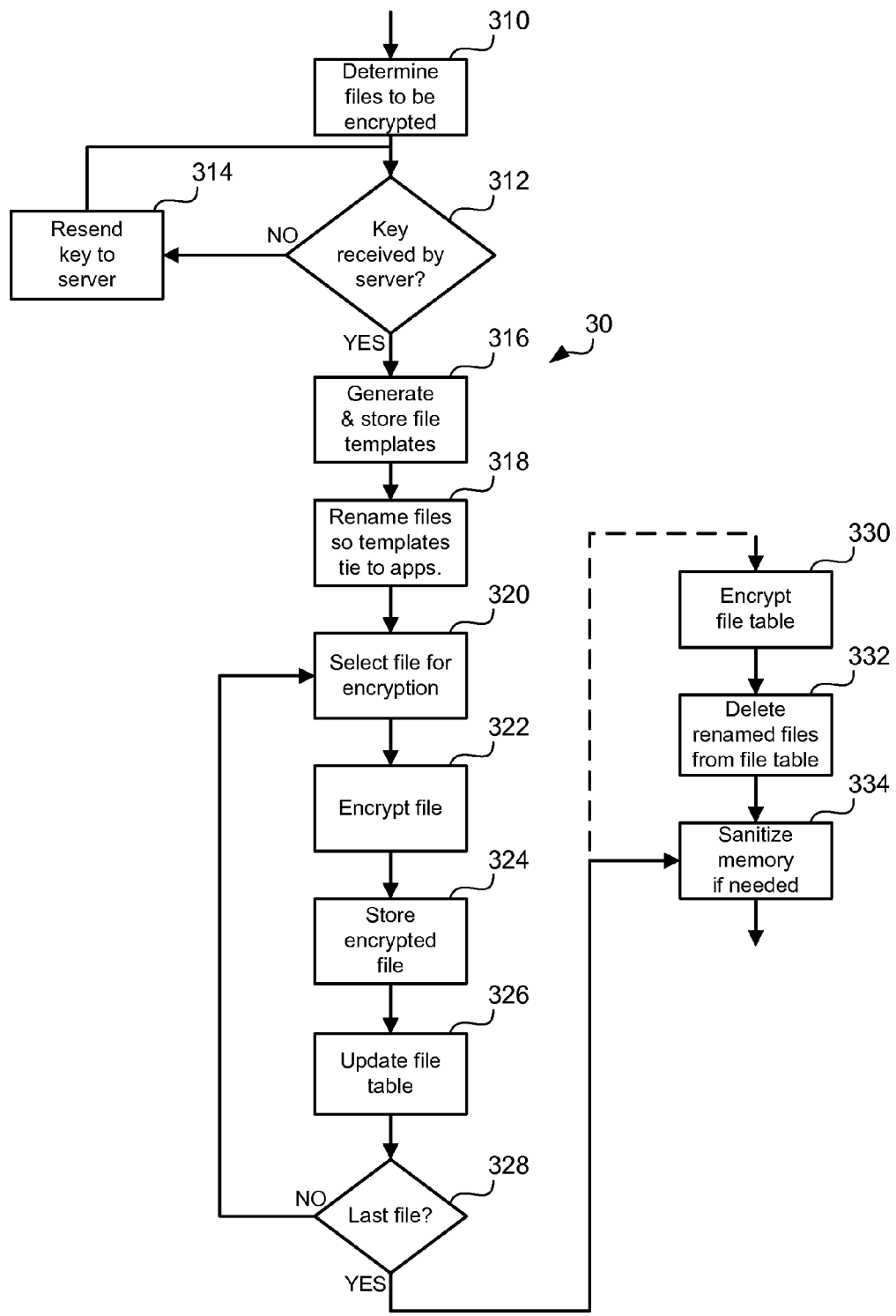
FIG. 4 is a process flow diagram of a portion of the process illustrated in FIG. 1 related to encrypting data files.

Any number of well known data encryption techniques may be used by the mobile handset to encrypt data files according to the various embodiments. An example of one particular method is illustrated in FIG. 4. Since it is anticipated that several data files may need to be encrypted, and that the user may, in some cases, identify specific data files to be encrypted, the mobile handset may determine the files to which the encryption and algorithm will be applied, step 310. This information may be obtained from the option data included in the SMS message data payload or from information previously stored on the mobile handset. For example, the SMS message data payload may include information identifying particular types of files to be encrypted, or groups of files previously identified by some group identifier. Alternatively, the user may identify files for encryption to the mobile handset in advance, such as by indexing or otherwise indicating files considered to be confidential and thus in need of encryption-type protection. Therefore, in step 310, the mobile handset uses data in the SMS message and/or stored in memory to create a list or index subset of data files that will be encrypted. In doing so, the mobile handset may create an indexed list file names or pointers for use in subsequent iteration processing.

Before beginning the encryption process, the mobile handset may confirm that the encryption key is known to the server. This is to ensure the data files are not encrypted using a key that will be lost forever when it is deleted from the mobile handset. Therefore, the mobile handset may confirm whether the message passing the key back to the server has been acknowledged, test 312. If that message has not been acknowledged, then the mobile handset may wait longer or resend the encryption key to the server, step 314. This loop of waiting and resending the key to the server may continue until an acknowledgement message is received from the server, in which case the result of test 312 will be "yes." On the other hand, if the encryption key was included in the SMS message, then in such embodiments the key is necessarily known to the server, so the result of test 312 will always be "yes."

Since it is desirable to avoid mobile handset operations which could tip off a thief that some process is ongoing, it is important to avoid errors or other unpredictable behavior of handset applications that could result from encrypting data files which are routinely accessed by handset applications. Therefore, as part of the encryption process, in step 316 the mobile handset may generate and store mock data files or standard data templates suitable for use by handset applications and substitute these generated files for the data files to be encrypted. For example, if the phone book data file is to be encrypted, a mock phonebook data file will be created containing fake names and phone numbers sufficient to enable the phone book application to function. Such data file templates may be previously generated and just maintained in memory, or maybe generated at the time that the encryption application is activated.

The mobile handset then renames the data files to be encrypted and renames the mock data templates so that the templates take the place of the data files in the file address directory table used by the applications, step 318. This is a simple renaming procedure that needs to be accomplished quickly and accurately to minimize the potential for a software error that could result from an application accessing a data file that is in the process of being renamed. An example of a renaming algorithm is illustrated in the FIG. 5 which is discussed in more detail below. Once the data files to be encrypted have been renamed and replaced in the file address directory table, the data files can then be encrypted without concern that unpredictable behavior may result from applications trying to access the data files during the process.

In situations where more than one data file will be encrypted, the mobile handset may encrypt the files iteratively by executing loop through the encryption operation as illustrated in FIG. 4. Using an index value related to the file index or pointer table developed in step 310, the mobile handset selects a file for encryption, step 320, and the selected file is encrypted, step 322, using any of a variety of known encryption algorithms using the encryption key pass to the algorithm in step 214. The encrypted file is then stored in memory of the mobile handset, step 324, and the memory file location table is updated to record that the selected data file is now in the location of the stored encrypted data file.

Next, the file location of the stored encrypted file may be recorded in a separate file location table dedicated to the encrypted files, step 326. The purpose of this table is to maintain a file location table for the encrypted files which can be used in a file recovery procedure. Since the locations of the original data files and their encrypted counterpart files may be deleted from the mobile handset's file location table as part of the encryption process, maintaining a table of locations of the encrypted data files may be necessary to enable the mobile handset to transmit the files to the server and to quickly find and recover those files in the event of a recovery procedure.

Finally, the index is tested against the file index or a pointer table to determine if the last file has been encrypted, test 328. If the last file has not been encrypted, the index is incremented and the next file is selected, looping back to step 320.

In an optional embodiment (indicated by a dashed arrow), if the last file to be encrypted has undergone the encryption process (i.e., the results of test 328 is "yes"), a file table containing the file locations of the encrypted files may itself be encrypted, optional step 330. By encrypting the data file table, the mobile handset is not able to access and display the encrypted files. Also, this encrypted file table can be uploaded to the server is part of the backup process, so that the recovery process can include replacing the file table used for decrypting the data files.

As part of the optional embodiment, with the data files encrypted and stored in new locations in memory, the renamed data files are deleted from the file location table, optional step 332. This may be accomplished by doing a conventional deletion of the files which removes them from the file location table but does not delete the information from memory. At this stage, the mobile handset cannot readily recall the data files since there is no file location information stored in the file location table. Alternatively, the file names in the file location table may be rendered invisible so that they cannot be listed by an unauthorized person looking for data files to misappropriate As the final step in the encryption process, the data registers which held the data files prior to encryption may be sanitized, step 334, to fully remove the data from memory. While renaming the data files and removing the renamed data files from the file location directory table renders the mobile handset unable to access the data files, at least portions of the original data remain stored in nonvolatile memory where it could be accessed with the right equipment. To prevent this, random data can be written to the memory locations where the data files were stored prior to being encrypted. Writing new data (or just "1" or "0") into the memory locations is known as sanitizing the memory.

Figure 5:
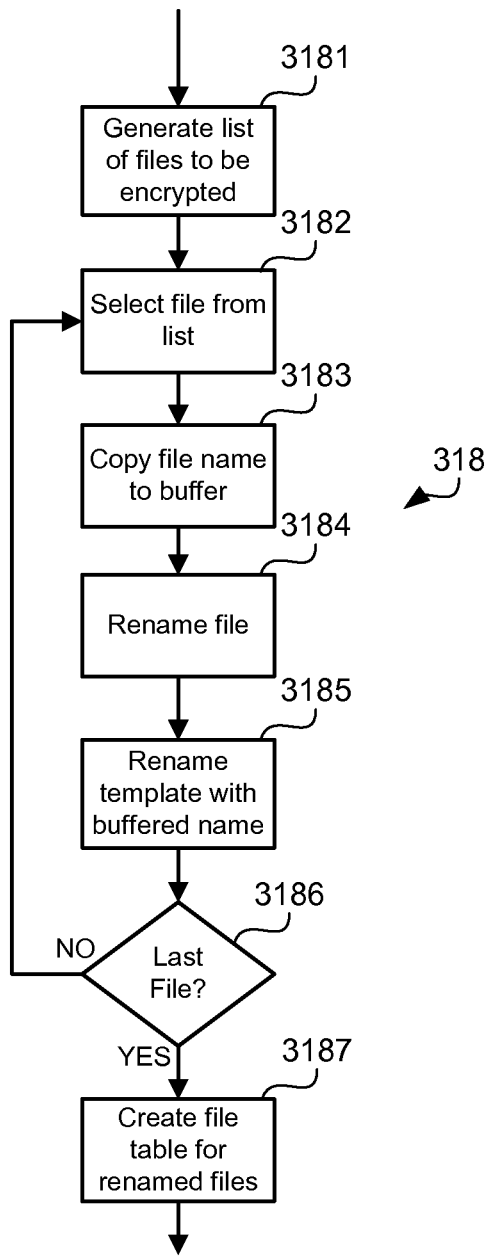
FIG. 5 is a process flow diagram of a portion of the process illustrated in FIG. 1 related to renaming data files prior to an encryption.

FIG. 5 illustrates the example steps that may be implemented by the mobile handset in order to rename data files prior to encryption. Such activities are incorporated within step 318 of FIG. 4. If a list of the files to be encrypted has not already been generated (e.g., in step 310), such a list is generated to be used for the renaming the loop, step 3181. Using this list, a file is selected, step 3182, and its file name copied to a buffer memory location, 3183. The name of the selected data file is then changed (i.e., renamed) by changing the name of the file listed in the file location table, step 3184. Next, the corresponding template data file is renamed using the file name stored in the buffer memory, step 3185. If more files remain to be renamed, test 3186, the process loops back to step 3182 to select the next data file. If the selected data file is the last file in the list of files to be encrypted, the mobile handset may create a separate file location table listing the names and locations of the renamed data files to be used for backup and recovery purposes, step 3187.

Figure 6:
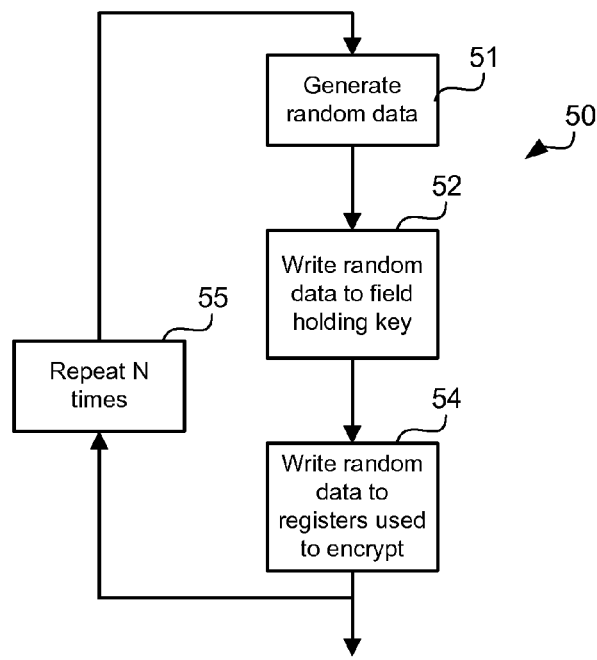
FIG. 6 is a process flow diagram of a portion of the process illustrated FIG. 1 related to deleting the encryption key.

FIG. 6 illustrates examples steps that may be taken to delete the encryption key from the handset memory, which is step 50 in FIG. 1. It is important to remove the encryption key from all locations where it may be stored. Otherwise a thief may be able to gain access to the files the user has attempted to secure. Therefore, the data fields holding the key will be sanitized, such as by generating random data, step 51, and writing this data to the memory fields which held the encryption key, step 52, as well as to all registers used in the encryption algorithm will also be sanitized, step 54. This process of generating random data and writing to the registers to be repeated a number of times (N) in a loop, step 55. Other methods of sanitizing memory locations may also be used.

Figure 7:
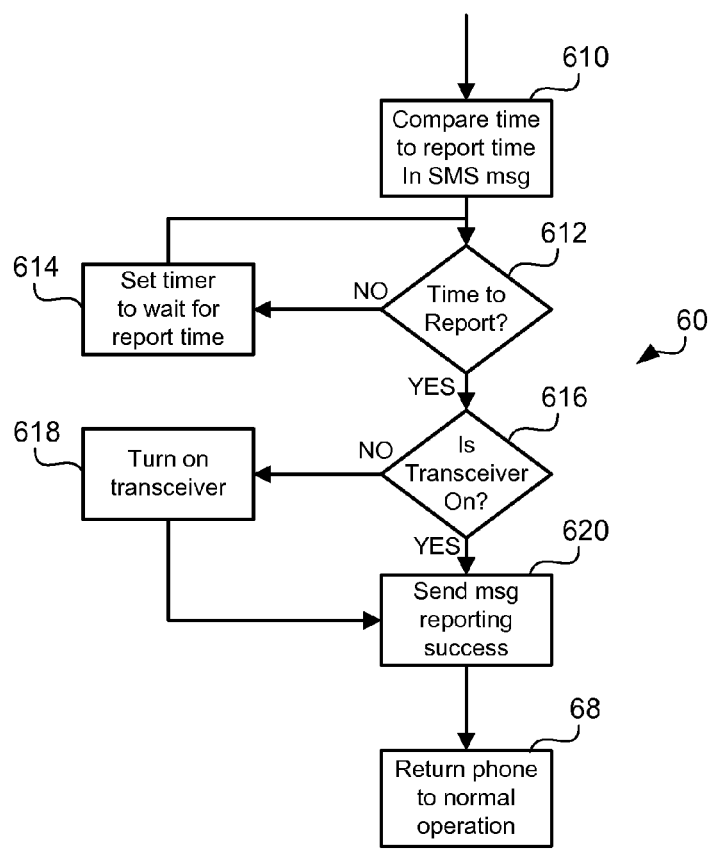
FIG. 7 is a process flow diagram of a portion of the process illustrated in FIG. 1 related to reporting successful completion of the data encryption process.

FIG. 7 illustrates example steps that may be taken to report the successful completion of the encryption process illustrated in FIG. 1. In this embodiment, the mobile handset merely reports successful completion and does not attempt to upload data files to the server. One of the options that may be presented to the user in the various embodiments is the ability to control the time at which the mobile handset is to report its success. A user may be anxious to receive immediate notification, and therefore prompt of reporting of success will be requested. On the other hand, the user may worry that the mobile handset has been stolen and therefore desire not to have the handset perform any operations that might tip off the thief that countermeasures are being taken to secure data. In such a situation, the user may specify that the success reporting should be conducted at a time when it is unlikely that the mobile handset is in use, such as after 2:00 AM and before 7:00 AM. Other reporting times may be requested by the user as well. To accommodate this flexibility, the handset may receive a reporting time in the SMS message which can be compared to the current date and time of day stored in memory, step 610. If the present time does not match the requested reporting time, test 612, the mobile handset may set a timer to wait until the requested reporting time, step 614.

If the handset determines that it is time to report success (i.e., the result of test 612 is "yes"), the handset may test to determine if the cellular network transceiver is turned on, step 616. Including this test is necessary since the success message may be sent long after the activation message was received. If the transceiver is not turned on, the processor may turn on the transceiver, step 618. In doing so, the handset processor may also deactivate ring tones and notification tones so that the handset does not announce that the transceiver has been activated and incoming phone calls do not activate a ring tone.

If the transceiver is on, the mobile handset constructs a message to the server including the code which reports success, step 620. This message may be any form of data message supported by the mobile handset and the cellular telephone network. For example, the message may be an electronic mail (e-mail) message or an SMS message directed to the server. The server return address for e-mail or SMS messages (which is a telephone number) may be contained in the original activation command message data payload. Alternatively or in addition, the server return address may be stored in memory of the mobile handset is part of the encryption application or initialization of the application. Since the server initiated the encryption process and therefore is expecting the success message, the success message may be as simple as one or more binaries flags (e.g., "1" for success and "0" for failure or error).

After sending the success message, the mobile handset will be returned to its previous operating condition, step 68. If the transceiver was off at the time that the success message was initiated, this step would involve turning the transceiver off. This step would also involve reactivating all ring and notification tones, so that a thief would not be tipped off that any configuration changes had been implemented. If the mobile handset is "playing dead" because it was commanded to turn off during the encryption process, the step of returning the mobile handset to its previous operating condition, step 68, will also include turning off the handset without activating any shutdown notification tones or displays. As a result, the mobile handset will appear as the thief would expect.

Figure 8:
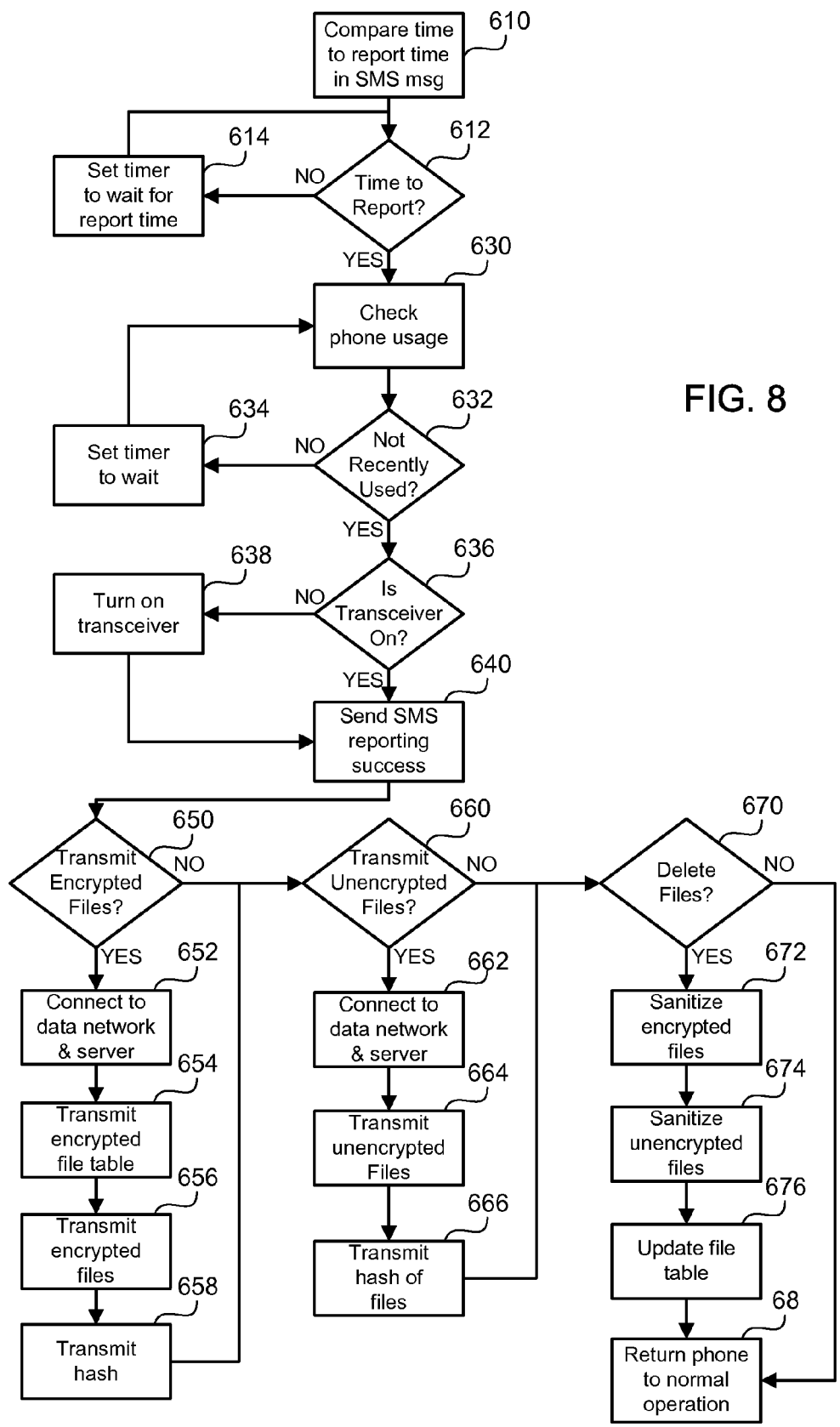
FIG. 8 as a process flow diagram of a portion of the process illustrated in FIG. 1 related to transmitting files from the mobile handset to the server.

In an embodiment and in response to user selections, the mobile handset may report success and then attempt to transfer data files to the server for backup purposes. The functioning of the mobile handset for this option is illustrated in FIG. 8.

As with a simple success reporting as described above with reference to FIG. 7, the mobile handset may compare a requested reporting time to the current date and time of day stored in memory, step 610. If the current time does not match the requested reporting time, test 612, the mobile handset may set a timer to wait until the requested reporting time, step 614.

If the mobile handset determines that it is time to report success (i.e., the result of test 612 is "yes"), the mobile handset may check to determine whether the phone has recently been used, step off 630. This check of recent activity may be included as a way to ensure that the mobile handset does not attempt to upload data files at a time when the handset is actively being used. Unlike the process of reporting a simple success message illustrated in FIG. 7, the transfer of data files to the server will typically require a noticeable amount of time during which the mobile handset may not be available for sending and receiving telephone calls. Attempting to transfer files during periods of active use could therefore tip off a thief that the backup function has been activated. If there has been recent activity on the mobile handset, it likely that the phone could be used again in the near future. However, if that handset has not been used for an extended period of time, it is more likely that the mobile handset could complete the data file transfer without being detected. Therefore, the mobile handset can check for recent usage by comparing the current date and time to the date and time of recent phone calls or menu activity. If the mobile handset has been recently used (e.g., the time since the last usage does not exceed a threshold value stored in memory), test 632, a timer may be set to cause of the mobile handset to wait a predetermined amount of time before checking phone usage again, step 634.

If the mobile handset has not been recently used, then the mobile handset may test to determine if the cellular network transceiver is turned on, step 636. If the transceiver is not turned on, the processor may turn on the transceiver, step 638. In doing so, the handset processor may also deactivate ring tones and notification tones so that the hand handset does not announce that the transceiver has been activated and incoming phone calls do not activate a ring tone.

If the transceiver is on, the mobile handset constructs a brief message to the server including the code which reports success, step 640. As with the simple success reporting process illustrated in FIG. 7, this message may be any form of data message supported by the mobile handset and the cellular telephone network, such as an e-mail or SMS message. Sending a brief success message ensures that the server is informed that the files were appropriately encrypted even if the mobile handset is subsequently deactivated by the thief, such as by removing the battery before the file transfer operation has completed.

After sending the success message, the mobile handset then determines from the activation message payload content or configuration options stored in memory whether encrypted files are to be transmitted to the server, test 650. If the mobile handset is to transmit encrypted files, the mobile handset establishes a data connection to the Internet and the server, step 652. This step may involve placing a data call via the cellular telephone network to an Internet access portal (or accessing a WiFi network), and then contacting the server by accessing its IP address. Any number of well known data transfer protocols may be used for transferring data. Alternatively, the mobile handset can connect directly to the server by calling a modem coupled to the server and establishing a direct data link. This step may also involve coordinating with the server to prepare it to receive the data files.

With a data link connection established to the server, the mobile handset then begins to transmit the encrypted data files. This may begin by transmitting the encrypted file listing table, step 654. This table of the data files that are about to be transmitted may be used by the server to receive the data files and by the server and the mobile handset in a subsequent data recovery process. The mobile handset then transmits the encrypted data files, step 656, followed by a MAC associated with each data file (or data file packet), step 658. The encrypted files may be sent as individual files, in which case the MAC associated with each file will be transmitted after that file. Alternatively, all of the encrypted files may be sent as a single concatenation data file, in which case the MAC value for the entire file will be transmitted after all the data files have been successfully transmitted. The server can use the MAC values to verify and authenticate each of the data file transmissions. If the MAC value cannot be verified, this indicates that the data file was not properly transmitted, in which case the server can request that the data filed be retransmitted. Thus, the process of transferring data files, steps 654, 656, 658, may include waiting for the server to report that each file was successfully transmitted before the next file is sent. If the server informs the mobile handset that a file has not been successfully received, that file may be retransmitted and the process repeated until all files have been successfully been received by the server.

Once all encrypted files have been transmitted to the server (or if no encrypted files were to be transmitted), the mobile handset determines from the activation message data payload content or configuration options stored in memory whether non-encrypted files are to be transmitted to the server, test 660. If the mobile handset is to transmit non-encrypted files, the mobile handset may establish a data connection to the Internet and the backup server, step 662, if a data connection is not already established. The process of establishing the data connection to the server in step 662 is substantially the same as the process described above with reference to step 652. Once the data connection is established to the server, the selected non-encrypted data files are transmitted along with a MAC value, steps 664, 666, in a manner substantially similar to the transmission of encrypted files described above with reference to steps 656 and 658.

Once all non-encrypted files have been transmitted to the server (or if no non-encrypted files were to be transmitted), the mobile handset determines from the activation message data payload content or configuration options stored in memory whether the transmitted data files should be deleted from the handset memory, test 670. This test may include identifying particular data files for deletion, as may be indicated in the activation message payload or in user preference settings stored in the handset memory. In various embodiments, the user may be provided the option of deleting particular files from the mobile handset, such as files including highly confidential information. Additionally, the file deletion option may permit the user to delete all files on the mobile handset, as may be appropriate when the mobile handset is determined to be lost or stolen and recovery is highly doubtful. This option will deny any thief or finder of the mobile handset the use of all data and applications stored on the mobile handset.

If data files are to be deleted (i.e., the result of test 670 is "yes"), the selected (or all) encrypted files are deleted and sanitized, step 672, and the selected (or all) non-encrypted files are likewise deleted and sanitized, step 674. As noted above, simply deleting a file from the mobile handset merely removes the file location from the file location table, leaving the data resident in nonvolatile memory. Therefore, to protect the deleted files from being accessed, the memory locations of the data files are sanitized by writing random data or ones and zeros into the memory locations of the data files in steps 672 and 674. Finally, the file location table may be updated to reflect the current configuration of memory, step 676. The memory locations occupied by the file location table may also be sanitized to remove all evidence of the files that were at one time stored on the mobile handset.

Once the file transfer operations and file deletion operations have been completed, the mobile handset is returned to its previous operational condition, step 68. As a discussed the above with reference to FIG. 7, this step may involve returning ring tones, activation tones, display options, and indicators of normal operation back to the configuration of the mobile handset prior to initiation of the encryption operation. If the mobile handset was in the "playing dead" mode described above, the mobile handset will be turned off at the completion of this step.

Figure 9:
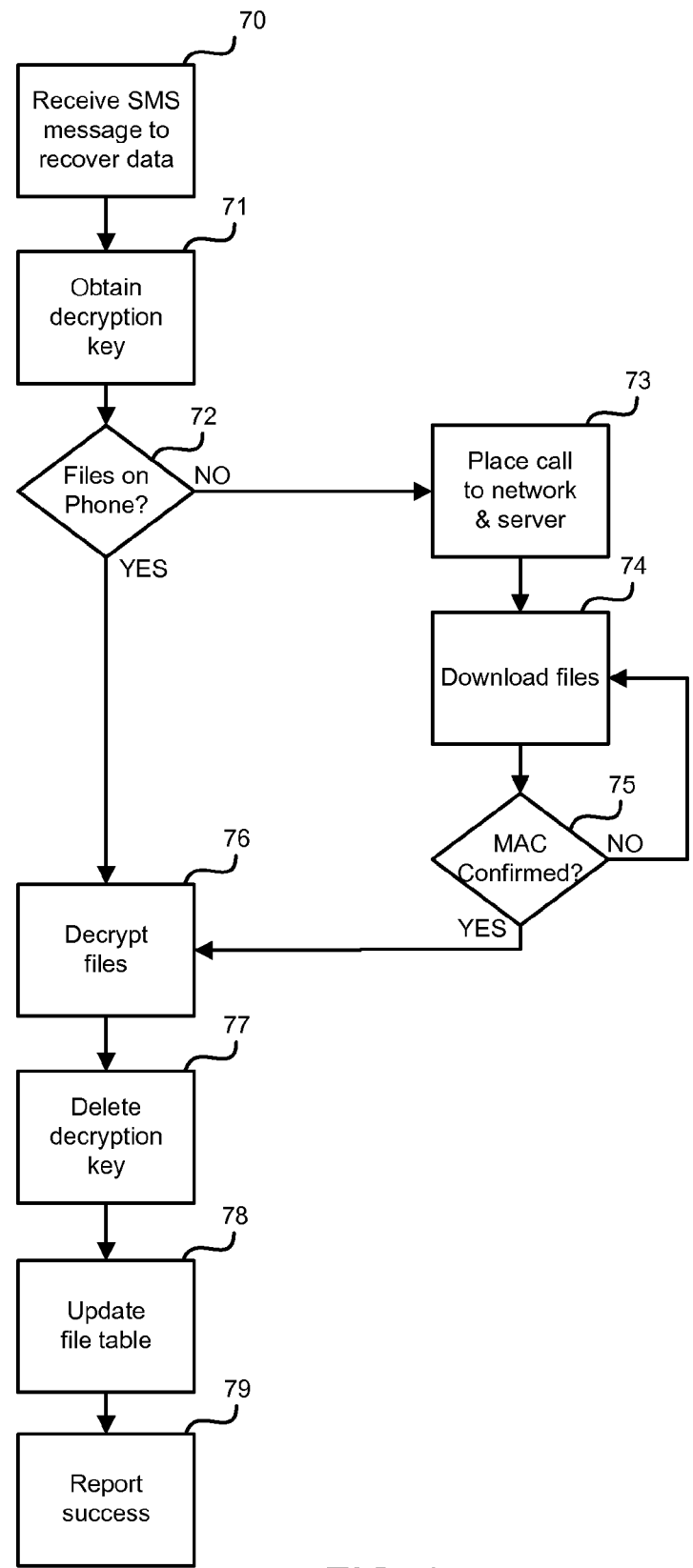
FIG. 9 is a process flow diagram of an embodiment method for recovering data files to a mobile handset.

The embodiments described above enable the mobile handset to secure data files and create backups for data files maintained in a server that can be used to recover the information in the event the mobile handset is found or a new mobile handset is obtained as a replacement. FIG. 9 illustrates steps of an example embodiment for completing a file recovery operation on the old mobile handset.

Referring to FIG. 9, the mobile handset may receive an activation command message, step 70, directing the mobile handset to initiate a data recovery application. The receipt of such an activation command message in step 70 may follow the same basic process as described above with reference to FIG. 2. Since the data recovery process is presumably conducted by the proper owner of the mobile handset, there is no need to deactivate any features of the mobile handset as provided in step 120.

Since confidential data files will be transmitted in an encrypted format, it is necessary for the mobile handset to obtain the decryption key, step 71. Since the encryption key was deleted from the mobile handset at the time that the encryption process was completed, it is necessary for the mobile handset to obtain the decryption key from the server even if the mobile handset had generated the encrypted files or encrypted files are presently stored in the handset's memory. The decryption key may be included as part of the recovery activation message, so the decryption key can be obtained following a procedure such as described above with reference to FIG. 3A. Since the activation message will typically be encrypted, as described above with reference to FIG. 2, there is little risk in disclosure of the decryption key by transmission of the activation message.

It is possible that the encrypted files remain stored on the mobile handset in the situation where the mobile handset has been found or recovered. Therefore, the mobile handset first tests whether the files to be of recovered exist on the mobile handset or must be downloaded from the server, test 72. If the files are not on the mobile handset, the mobile handset may place a call to an Internet access portal and establish an Internet connection to the server by accessing its IP address, step 73. Alternatively, the mobile handset may call the server directly by placing a telephone call to a modem coupled to the server and completing the data link connection process. Once a data connection is established with the server, the mobile handset requests download of the backup data files and receives the files via the data link, step 74, verifying each file (or data packet) received based on its MAC, test 75. As part of the file download process, a MAC will be included in the transmission to enable the mobile handset to verify and authenticate each data file transmitted. As discussed above, this can be accomplished by comparing the received MAC value to a hash generated using a known authentication key and the same algorithm is used by the server to generate the MAC. If the generated and received MAC values do not match then the message is not confirmed and a repeat of the file download will be requested by the mobile handset to the server.

If the encrypted files are on the mobile handset or have all been successfully downloaded to the mobile handset, the mobile handset then decrypts the files, step 76. In a manner similar to the process of encrypting the files, the decrypting process may include decrypting a table of files that are to be decrypted that can be used to generate a file location table for the new files and an index for iteratively decrypting the files. Alternatively, the mobile handset may individually decrypt each file and store it sequentially in file locations in the normal process of storing data files. The decryption process involves the decrypting key and a decryption algorithm that is compatible with the encryption algorithm used to create the encrypted file in the first place. Methods for decrypting and storing files are well known in the computer arts.

Once all the files have been decrypted, the mobile handset deletes the encryption key, steps 77. The process for deleting the decryption key is substantially similar to the process described above with reference to FIG. 6. After this, the file location table may be updated as necessary to reflect the new data file content, step 78, followed by a report of successful file recovery, such as the presentation of a suitable display on the mobile handset, step 79.

Figure 10:
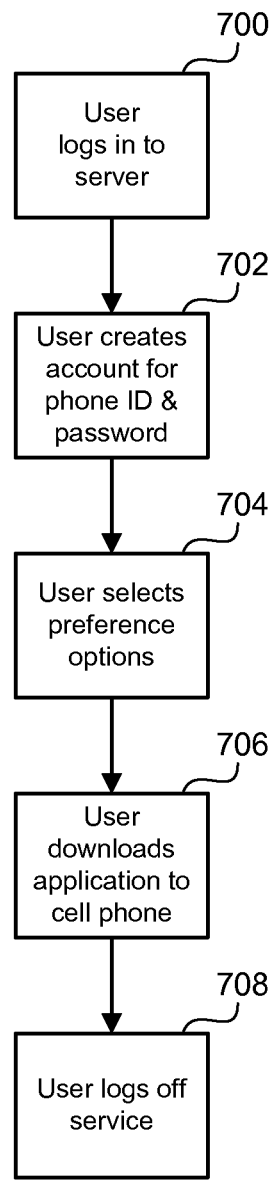
FIG. 10 is a process flow diagram of user steps involved in establishing an account for with a server for data backup services.

In order to employ the various embodiments, a user must typically establish an account with the server that provides the encryption and backup services. FIG. 10 illustrates examples steps that may be followed by a user in setting up such an account. A user may log onto the server via an Internet browser on the mobile handset or a computer coupled to the Internet by contacting the IP address of the server, step 700. The browser on the user's mobile handset or computer will receive and display a web page from the server which provides information regarding the service and prompts the user to input information necessary to create an account, step 702.

Bibliographic information regarding the user, such as name address, telephone number and e-mail address, may be entered to identify the user. Then the user creates an account name or username, and a password to be used with a particular mobile handset. The user also enters the telephone number of the mobile handset, as well as additional identifying information, such as serial number or cellular network account number. This information is transmitted to the server, such as in response to clicking on a submit button, which generates the data record necessary to establish the user's account.

In an embodiment, the user does not submit the password to the server via the Internet, and instead submits the password by an out-of-band method, such as by a landline telephone call, in an e-mail to an e-mail address, or even via regular mail, once the user information has been verified. Also, the server may create the password and send the password to the user via an out-of-band method. Transmitting the password in this manner adds another layer of security to the system and helps to prevent denial-of-service attacks in which illegitimate users subscribe, activate and then dominate the service with random activity.

With an account established, the server may send a web page to the user's computer providing a menu screen to enable the user to select preference options. Such options include the ability to select particular files or file types for encryption, select files or files types for backup to the server, select an option of performing periodic data backups to the server, and select a number of actions that will be taken in the event the user needs to activate the data encryption and/or deletion features. These options may also include an opportunity to sign up for activation of encryption and file backup processes from a cellular telephone, such as by sending a SMS message or dialing a voice recognition or voice prompt menu service. Once the user has made all the selections required, the user's responses are sent to the server such as by clicking on a submit button, step 704.

With the user account open and user preferences recorded, the server is then able to initiate the service of the various embodiments. To accomplish this, the mobile handset application that performs the embodiment methods described above needs to be loaded onto the mobile handset memory, step 706. This may be accomplished by downloading the application to the mobile handset by connecting the mobile handset to the user's personal computer, such as by means of a USB, FireWire cable, or infrared data link connection. Alternatively, the user may use a browser on the mobile handset to connect to the server and request a download of the application, such as by clicking on a hyperlink. Alternatively, the user may request that the application be sent to the mobile handset by a data file or electronic message that the mobile handset can receive and process to load the application into memory.

Downloading the application to the mobile handset enables the handset to perform the functions described above for the various embodiments. The application, or an options data file downloaded along with the application, may include a number of configuration parameters for controlling the operation of the mobile handset during data encryption and recovery operations. Such configuration parameters may be established based upon the configuration and operational preferences indicated by the user at the time the account is opened, or at a later time by accessing a menu presented by a server-hosted web page or on the mobile handset itself.

As part of the initialization process, such as when the application is downloaded to the mobile handset, the server may also provide a unique failsafe encryption key which the mobile handset stores in a secure memory. Such a failsafe encryption key can be used by the mobile handset to encrypt a freshly generated server or client generated encryption key in the event the server is not able to connect to the server. The failsafe encryption key may also be used in the event the mobile handset determines that files should be encrypted based upon an internal event, such as described more fully below with reference to FIG. 18, but a connection to the server cannot be established to transmit or receive an encryption key. In such cases, the failsafe encryption key is obtained from memory (step 20), used to encrypt files (step 30) in the manner described above for the various embodiments, and then deleted from the mobile handset memory (step 50). Since the server provided the failsafe encryption key originally, it can recall it from memory to decrypt received encrypted keys or to decrypt files on the mobile handset. Since the key is of no use to unauthorized users until it has been used to encrypt files, at which point it will be deleted, the failsafe encryption key can be retained in the mobile handset memory until needed.

With the account established and the mobile handset application downloaded, the user completes the process by logging off the service, step 708.

Figure 11:
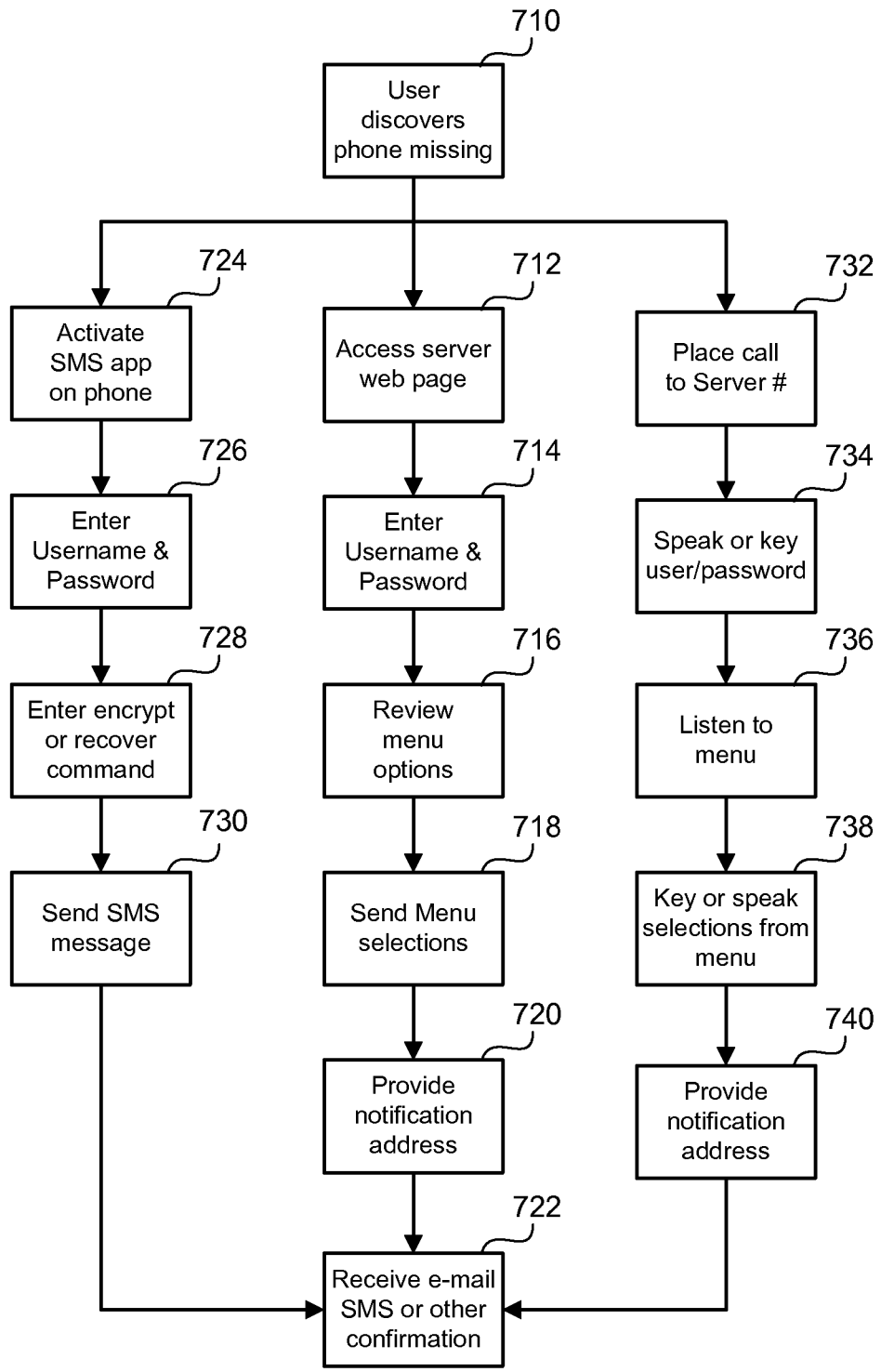
FIG. 11 is a process flow diagram of users steps involved in remotely activating encryption and backup of data stored on a mobile handset.

FIG. 11 illustrates an example embodiment of the steps that the user may follow in activating a file encryption and/or backup procedure. If the user discovers that the mobile handset is missing, step 710, the user has a variety of ways to request the server to initiate the file encryption and/or backup process. For one, the user may access to the server by using any computer with access to the Internet by directing the browser to the servers webpage IP address, step 712. Using the web page presented on the browser, the user then logs into the server by entering the username and password associated with the mobile handset, step 714. Using the entered logon information, the server can present the user with a web page providing a menu of options that can be activated. The user reviews the web page to select desired actions from the menu, step 716, and sends these selections to the server by clicking on a submit button or similar mechanism, step 718. If the selected menu options involve actions that require the server to notify the user of success or status of the operation, the user may also be presented with a webpage in which to enter the address or addresses at which the user would like to receive such notifications, step 720. Such addresses may be a telephone number for receiving SMS messages or an e-mail address for receiving e-mail notification. Finally, the user waits to receive confirmation of successful completion of the requested action, such as by e-mail or SMS message, step 722.

If the user does not have access to a computer coupled to the Internet, the user may also request activation of the encryption process by sending a particular SMS message to the server from another mobile handset. To facilitate this option, a special application may be loaded on the user's other mobile handset which prompts the user to enter the necessary information to log into the server and request particular activation options, as well as generating and send the SMS message to the proper server address. In use, the user may select the application from a menu of mobile handset applications for activation, step 724. This mobile handset application then prompts the user to enter a username and password which can be accomplished using the mobile handset keypad, step 726. Next, the mobile handset may provide the user with a selection of options that can be carried out, such as to either encrypt or recover data files, which the user can select by means of the mobile handset keypad, step 728. With the necessary information received from the user, the mobile handset application then formats an SMS message to the server including the information required by the application to implement the requested at action, and sends the SMS message via the cellular telephone network, step 730. This message may also request that confirmation messages be sent to the user at the telephone number in an SMS address field. Thereafter, the user merely waits to receive a confirmation SMS message, step 722.

If the user does not have access to either a computer or a cellular telephone, the user may still activate the encryption service and/or backup service from any telephone by calling a voice prompt menu service coupled to the server, step 732. Like any automated call processing system, the service may answer the telephone call and prompt the user to speak or enter the username and password associated with the mobile handset account, step 734. This information is passed to the server which can then authenticate the user and generate the appropriate voice prompt menu for the service options associated with the user account. The user then merely has to listen to the voice prompts options, step 736, and speaker or press an appropriate key to select the desired activation options, step 738. For example, the menu may invite the user to press 1 if encryption of the files is desired, press 2 if encryption and backup of the files is desired and press 3 if encryption, backup and then deletion of the files is desired. Additional account maintenance options may also be supported via a voice prompts menu service. If the requested action involves a user notification, the voice prompt menu may also prompt the user to provide an address to which notification will be delivered. This address may be a telephone number for receiving an SMS message, an e-mail address, or a telephone number at which a computer generated voice can report the success or failure of the requested operation. Finally, as with the other options, the user then hangs up and awaits reception of a confirmation message, step 722.

Figure 12A:
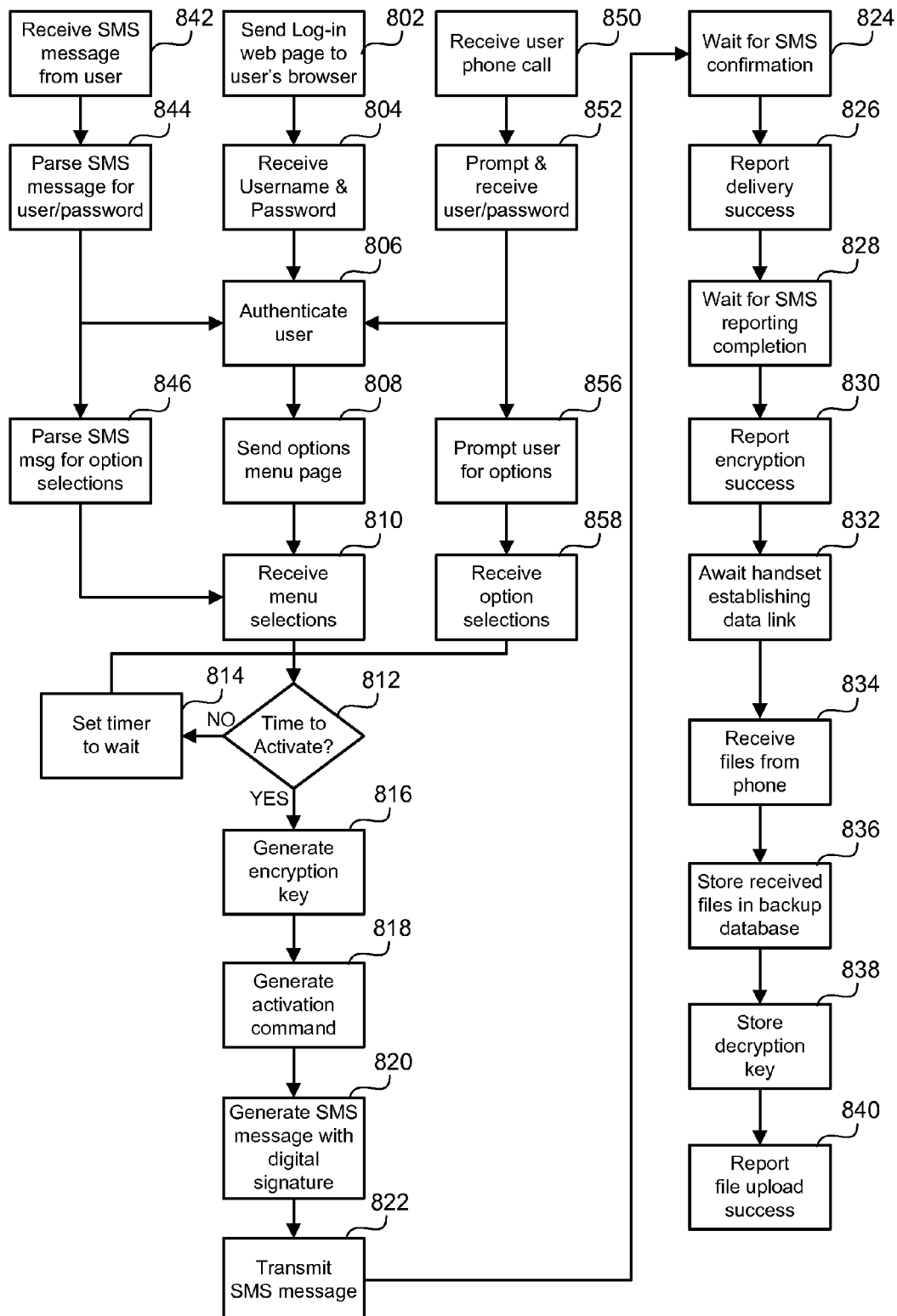
FIG. 12 is a process flow diagram of an embodiment method implemented on a server for remotely directing a mobile handset to encrypt and backup data files.

In order to enable the various embodiments described above, a server connected to the Internet may be configured with software to provide supporting functionality, an example embodiment of which is illustrated in FIGS. 12A and 12B. Such a server may be any commercially available server system and associated mass storage memory, with the server processor operating software configured to cause the server to perform the steps of various embodiment methods described herein.

Referring to FIG. 12A, the server may be configured to receive a notification from a user by any of the three methods by which the user can request activation of the encryption and/or backup processes. For example, in response to a query to the IP address of the login web page, the server can send a login web page to the user's browser via the Internet, step 802. The server is configured to receive the username and password, as well as other information that may be provided by the user to unable user authentication, step 804. Using the received information, the server compares the received username and password to the username and associated password stored in a database of registered mobile handsets and users. If the username and password match, then the server authenticates the user, step 806. If the username and password do not match a record store to the database, the server may send a web page resend the login page requesting the user to reenter the username and password or set up a new user account.

If the user is authenticated, the server will send an options menu web page to the user's browser, step 808. As discussed above, this webpage may present the user with a number of options to enable the user to control the activation of the encryption and backup capabilities. For example, this menu may present the options in the form of a list of selections with radio buttons that can be clicked in order to select one or more options. The server receives the user's menu selections in the form of an IP packet formulated by the user's browser and interprets the received data to determine the actions that are to be initiated, step 810.

One of the options that a user may select is the time at which the file encryption and/or deletion is to occur. For example, if the user believes that the mobile handset has merely been misplaced, the user may request that the encryption process be activated in an hour or two in order to give the user time to search for the mobile handset. This may be appropriate when the user has access to a computer at the time the mobile handset is discovered to be missing, but will not have access to the computer while searching for the mobile handset. This gives the user time to find the mobile handset and then contact the server (such as by using the mobile handset to access the server via a browser or SMS message) to cancel the encryption activation if the handset is found. Therefore, the server may be configured to compare the current time to a selected time for activation, test 812. If the current time is not equal to the selected time for activation, the server may set a timer to wait a required amount of time, step 814.

If activation of encryption is requested immediately (or if the time to activate has arrived), the server may generate an encryption key, step 816. As described above with reference to FIG. 3A through 3C, a variety of methods may be used to obtain the encryption key. If the mobile handset is to propose the encryption key, then the server does not need to generate an encryption key in step 816. If the server generates the encryption key, it may generate a random encryption key in step 816. If the server implements the public key encryption method, the server may generate or recall from memory the public key in step 816. The server also generates the activation command and associated data based on the user's selected options, step 818. This may involve generating a text sequence containing a code for the desired activation command, followed by data corresponding to the user's selected options. For example, as mentioned above, user options to encrypt all or selected data files, download data files to the server, and delete files from the mobile handset at the completion of the download sequence may be indicated in the activation command text sequence by binary flags (i.e., "1" or "0") in particular locations within the text block.

The server then generates an SMS message (or other type of data message), step 816. This message includes the activation command, the encryption key (if included), an authentication key and user option data associated with the activation command. As discussed above, in order to protect the encryption keys, the message data payload may be encrypted before the SMS message is assembled and transmitted. To enable the mobile handset to recognize the message as containing an activation command, the code indicating the activation command may not be included within the encrypted portion of the message. Thus, the SMS message may include a non-encrypted header and activation command portion followed by an encrypted data payload portion. An example of an SMS message so configured is provided in FIG. 21 which is described in more detail below.

Having assembled the activation message, the server then transmits the message such as by sending an SMS message via the cellular telephone network, 822. Any available conventional method for sending messages to the mobile handset may be used by the various embodiments for transmitting the activation message. Once the message has been transmitted, the server may wait to receive an acknowledgement message which confirms that the mobile handset received the activation message, step 824. It is important for the server to monitor reception of acknowledgement messages which confirmed that the activation message has been received by the mobile handset due to the unreliability of the cellular telephone messaging system, as well as the possibility that the mobile handset may be turned off at the time. If an acknowledgement message is not received by the server within a set period of time, the server may transmit the message again. Once an acknowledgement message is received, the server may store the status to a status record data file and send a message to the user confirming that the activation message has been sent and received, step 826.

The server then waits for a message from the mobile handset reporting that the requested activity has been completed, step 228. As described above with reference to FIGS. 7 and 8, if the requested process is the encryption of data files, the mobile handset may send an SMS message back to the server informing the server that the files have been successfully encrypted. When a success reporting message is received, the server may store the status to a status record data file and send a message to the user reporting that the files have been successfully encrypted, step 830.

If the requested activation message includes a request to download data files to the server, the server will then wait for the mobile handset to establish a data link with server, step 832. Once a data link is established, the server may negotiate a file transfer protocol with the mobile handset and then receive the files via the negotiated data transfer protocol, step 834. Any known data transfer protocol may be used for this purpose. As data files are received, they are stored by the server in a database in records tied to the mobile handset account name, step 836. In this manner, the server can maintain a database of data files for a large number of mobile handsets. The encryption key used by the mobile handset device for encrypting data files will be saved by the server as part of this database, or in a separate database with a common index or data record key, step 838. Finally, when the download of data files is completed, the server may store the status to a status record data file and send a message to the user reporting that the files have been successfully backed up on the server, step 840.

As described above with reference to FIG. 11, a user may also initiate the file encryption process by sending a SMS message to the server from a second mobile handset. To enable this, the server may be configured with the necessary software to receive SMS messages from users, step 842. The server may receive the SMS message via the Internet connected to a cellular telephone network, or may have its own cellular telephone receiver configured to receive the SMS messages and pass them to the server processor. The server may also be further configured with software to parse the SMS message in order to obtain the user's username and password for use in authenticating the user, step 844. The username and password are then used by the server to authenticate the user just as if the information had been received via the Internet, step 806. The server may further be configured to parse the SMS message to obtain the requested actions and associated option data, step 846, which is then received and processed by the server just as if the information had been received from the Internet, step 810. Having received the information required to configure and send the activation message, the server can proceed in the manner described above for the remaining steps illustrated in FIG. 12.

As described above with reference to FIG. 11, a user may also initiate the file encryption process by calling a voice prompt service coupled to the server. To enable this, the server may be configured to receive the user phone call, step 850, and provide voice prompts and receive the username and password via the telephone, step 852. The username and password are then used by the server to authenticate the user just as if the information had been received via the Internet, step 806. The server may further be configured to prompt the user with a voice menu to select options for activation, step 856, and to receive the user's selections via voice recognition or touch tone recognition, step 858. The user options are received and processed by the server just as if the information had been received from the Internet, step to 810. Having received the information required to configure and send the activation message, the server can proceed in the manner described above for the remaining steps illustrated in FIG. 12.

Figure 13:
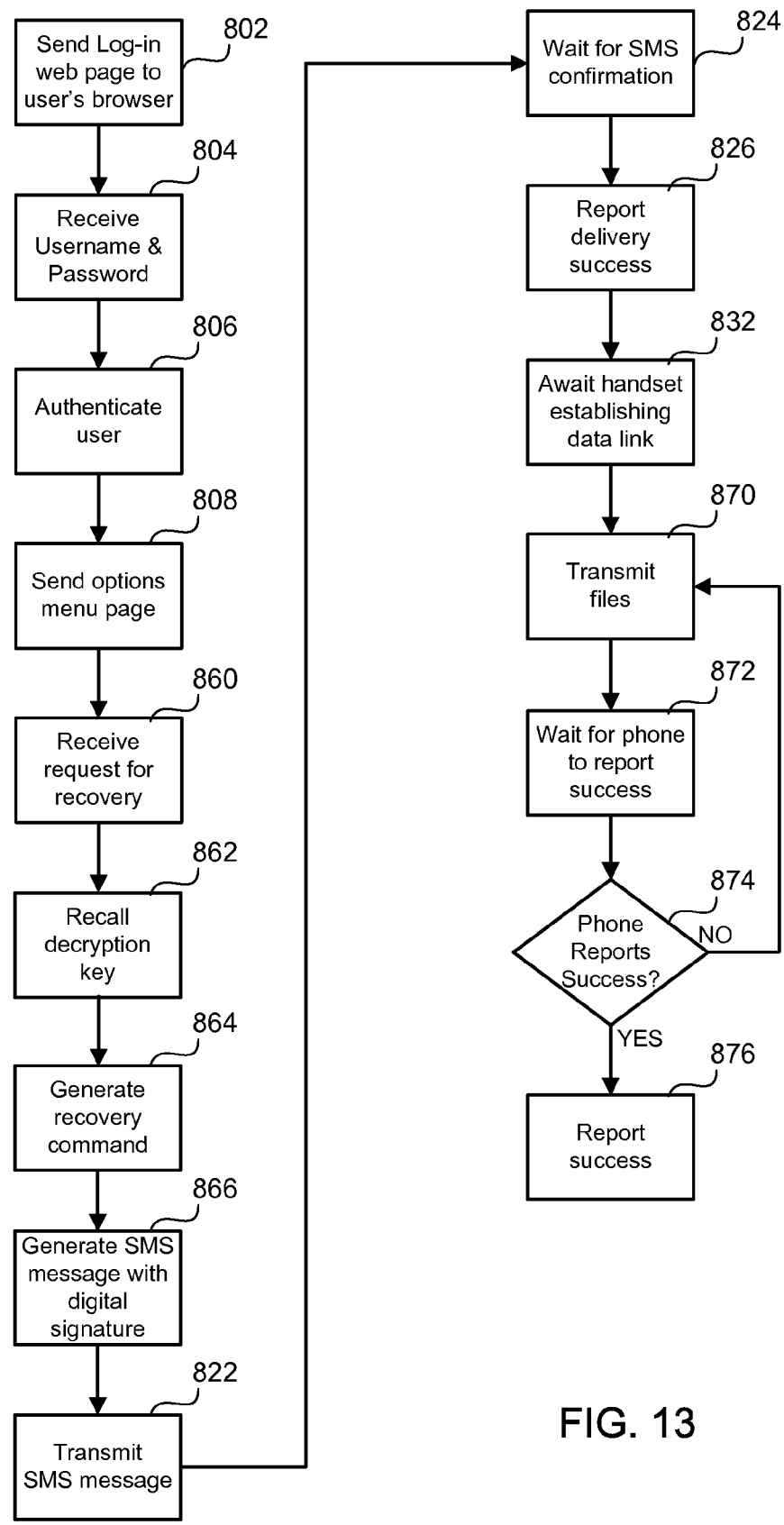
FIG. 13 is a process flow diagram of an embodiment method implemented on a server for restoring data files to a mobile handset.

The server may be further configured with software to receive requests from the user to restore backed up data files to the mobile handheld. FIG. 13 illustrates example embodiment steps for accomplishing the file restore process. The user may request activation of the file restore process by contacting the server via a computer connected to the Internet. To support this, the server is configured to prompt the user for login information, step 802, receive the username and password, step 804, and authenticate the user with this information, step 806, as described more fully above with reference to FIG. 12. Once the user has logged in, the server may present the user with the menu option page, step 808, and then receives a request from the user for the data recovery process, step 860.

To begin the data restore process, the server may recall the decryption key stored in the database associated with the mobile handset, step 862. The server generates an activation command message including the data restore command code and any associated user option data, step 864, and generates an SMS message including the decryption key and data restore command, step 866. As with other activation command messages, the data restore activation command code may be included in the SMS message in a non-encrypted format, while the encryption key, authentication key and activation option data may be encrypted. A MAC or authentication value based on the contents of the SMS message is also included to enable the mobile handset to verify and authenticate the message. With the recovery SMS message generated, the server then transmits the SMS message to the mobile handset, step 822, using an available transmission method.

As with other activation command messages, the server will await reception of an acknowledgement message, step 824, and record and report the successful delivery of the data restore activation message, step 826. If the activation message is not acknowledged within a predetermined time, the server may retransmit the activation command message. After the acknowledgement message has been received, the server waits for the mobile handset to establish a data link via a cellular telephone network call to the Internet (or directly to a modem coupled to the server), step 832. Once the a data link is established, the server and handset negotiate a data link configuration after which the server begins transmitting files to the mobile handset, step 870. As described above regarding other data file transmissions, the server transmits a MAC along with each data file transmitted so that the mobile handset can verify and authenticate the received data files to confirm that errors have not been introduced during transmission. To accommodate this process, the server may wait for the handset to report whether each file has been successfully received and authenticated, step 872. If the handset does not report success, the server may repeat the process of transmitting files (returning to step 870) until all the files have been successfully transmitted from the server to the mobile handset.

Once all files have been downloaded to the mobile handset, the server may report successful file recovery to the user, step 876. This notification may be by e-mail, SMS message or other mechanism requested by the user.

Figure 14:
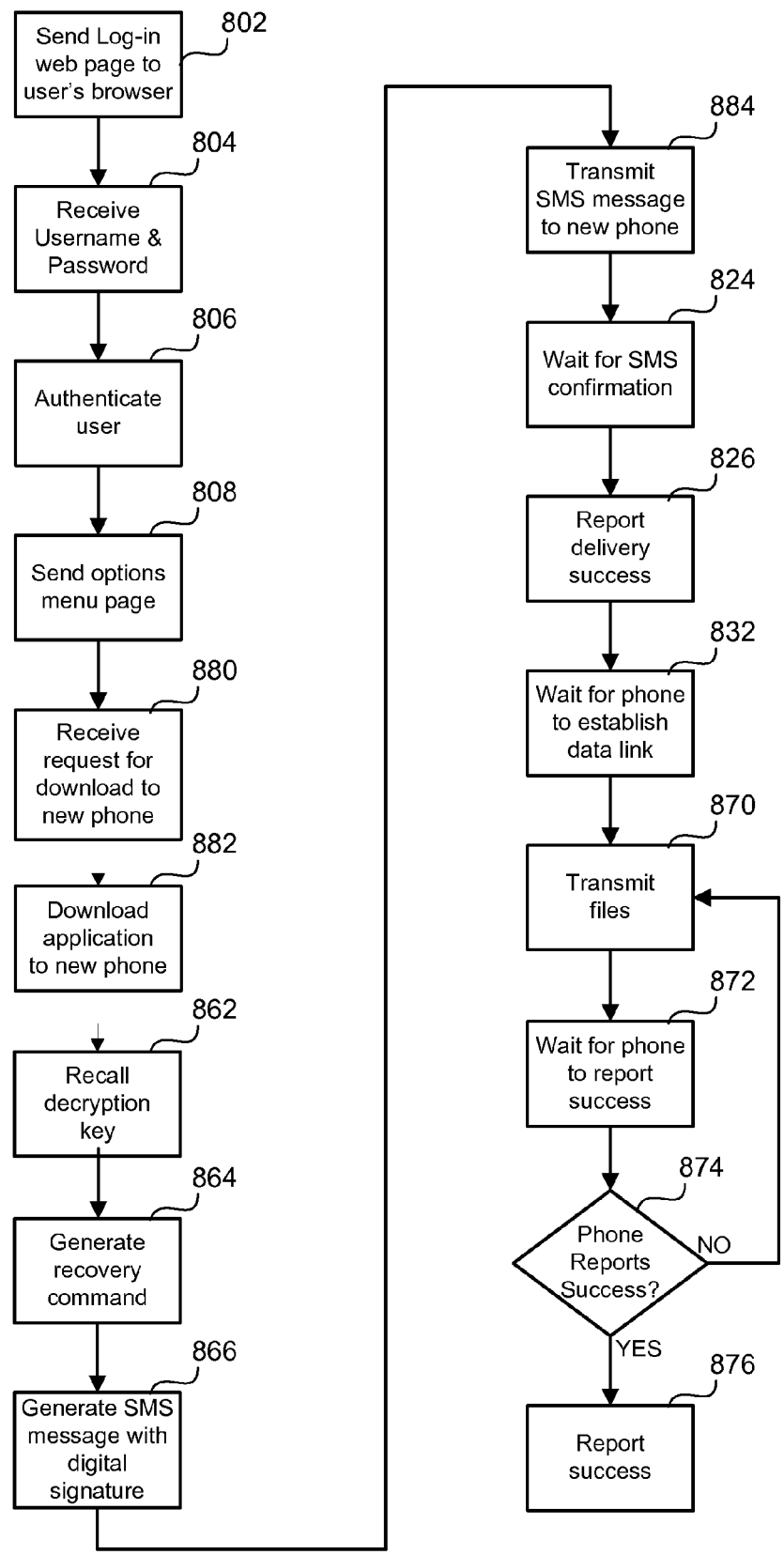
FIG. 14 is a process flow diagram of an embodiment method implemented on a server for downloading backed up data files to a new mobile handset.

If the mobile handset is lost or stolen, or simply wears out, the data files backed up on the server may be downloaded to and restored on a new or replacement mobile handset. FIG. 14 illustrates example embodiment steps for accomplishing a file restoration to a new mobile handset. Like the process for backing up the original handset illustrated in FIG. 13, the user may access the server via the Internet. To support this, the server is configured to prompt the user for login information, step 802, received the username and password, step 804, and authenticate the user with this information, step 806, as described more fully above with reference to FIG. 12. Once the user has logged in, the server may present the user with the menu option page, step 808, and then receive a request from the user for the data restoration to a new mobile handset, step 880. This process is similar to the data restoration to an old mobile handset described above with reference to FIG. 13 with the addition of a step of downloading an application to the mobile handset.

Before the server can download files to the new mobile handset, the handset must first be configured to receive the files. This may be accomplished by programming the new mobile handset with an application configured to perform the data encryption, backup and restoration functionality of the embodiments described above. This application may be loaded into the memory of the mobile handset in a variety of ways, including via a data cable coupled to a personal computer, via an over-the-air application download via the cellular telephone network, or via an infrared data link connection. In an embodiment, the server that supports the data encryption, backup and restoration functionality can download the application to the new mobile handset as part of the process of downloading the data backup files, step 882. In this option, the user may select a menu option (presented in step 808) to have the new mobile handset configured and loaded with data in one step. Alternatively, the server may query the new mobile handset to determine if the restoration application is present in the handset memory. For example, before sending the activation message, the server may send a query SMS message to mobile handset requesting it to report whether the necessary application has been loaded. If, in response to this query SMS message, the server receives a message acknowledgement but no response message, the server is informed that the necessary application is not present on the mobile handset. To enable a download of the application, the user may be prompted, such as with an instructional web page presented to the user's browser, to connect the mobile handset to the server and initiate the download. For example, the user may be instructed to contact the server by opening an Internet browser on the mobile handset and accessing a particular IP address to an application download page. Once the mobile handset displays the server's application download page, the user can begin the download process by activating a hyperlink on that page. Thereafter, the necessary application can be downloaded and installed in the mobile handset using well known data transfer protocols and application installation routines.

Once the data encryption, backup and restoration application has been installed on the mobile handset, the server may begin the data recovery process in a manner very similar to the method described above with reference to FIG. 13. The server may recall the decrypting key stored in the database associated with the mobile handset, step 862. The server generates an activation command message including the recovery command code and any associated user option data, step 864, and generates an SMS message including the decryption key and recovery command, step 866. As with other activation messages, the recovery activation command code may be included in the SMS message in a non-encrypted format, while the encryption key, authentication key and activation option data may be encrypted. A MAC or authentication value based on the entire contents of the SMS message is also included to enable the mobile handset to verify and authenticate the message. With the recovery SMS message generated, the server then transmits the SMS message to the new mobile handset, step 884, using an available transmission method. This transmission is just like the message transmission step 822 described above with reference to FIG. 13 except that the message destination address (i.e., telephone number in the case of an SMS message) is of the new mobile handset received from the user, such as in step 880, instead of the old mobile handset stored in the server database of mobile handset account information.

As with other activation messages, the server will await reception of an acknowledgement message, step 824, and record and report the successful delivery of the data restoration activation command message, step 826. If the activation message is not acknowledged within a predetermined time, the server may retransmit the activation message. After the acknowledgement message has been received, the server waits for the new mobile handset to establish a data link via a cellular telephone network call to the Internet (or directly to a modem coupled to the server), step 832. Once the a data link is established, the server and new mobile handset negotiate a data exchange configuration after which the server begins transmitting files to the mobile handset, step 870. As described above regarding other data file transmissions, the server transmits a MAC along with each data file transmitted so that the mobile handset can verify and authenticate the received data files to confirm that errors have not been introduced during transmission. To accommodate this process, the server may wait for the mobile handset to report whether each file has been successfully received and authenticated, step 872. If the mobile handset does not report success, the server may repeat the process of transmitting files (returning to step 870) until all the files have been successfully transmitted from the server to the mobile handset.

Once all files have been downloaded to the mobile handset, the server may report successful file recovery to the user, step 876. This notification may be by e-mail, SMS message or other mechanism requested by the user.

As part of the process or optionally in response to a menu selection by the user, the server may update the database record associated with the username and password to record the new address (e.g., telephone number) and other identifying information regarding the new mobile handset. By updating such records, the server is configured to support the data encryption, backup and restoration functions on the new mobile handset.

Figure 15:
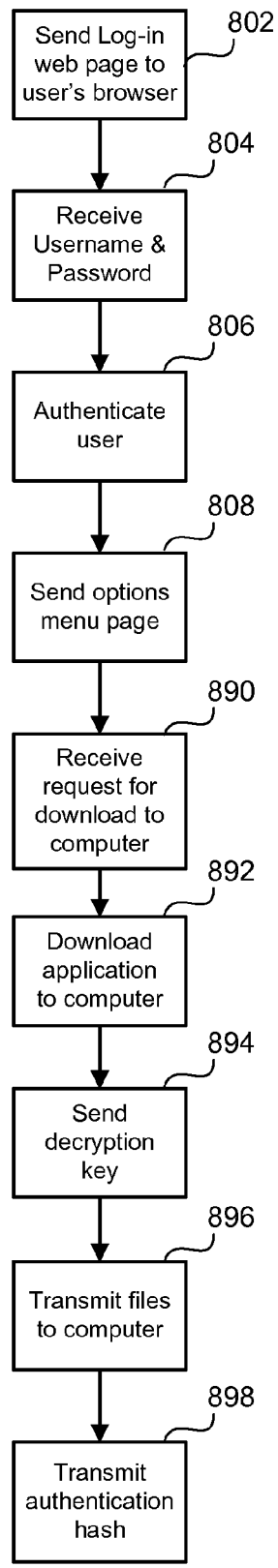
FIG. 15 is a process flow diagram of an embodiment method implemented on a server for downloading backed up data files to a computer.

In an embodiment, the server can also allow a user to download data files recovered or backed up from a lost or misplaced mobile handset to a personal computer via the Internet. FIG. 15 illustrates an example of an embodiment of server-based processes to support downloading of backup data to a personal computer. Similar to other user interactions with the server, the server in this embodiment is configured to prompt the user for login information, step 802, receive the username and password, step 804, and authenticate the user with this information, step 806, as described more fully above with reference to FIG. 12. Once the user has logged in, the server may present the user with the menu option page, step 808, and then receive a request from the user to download backup data to a personal computer, step 890. Since the computer is connected to the server via the Internet, this download can proceed using standard Internet data transfer protocols. For example, the download may be initiated by the user clicking on a hyperlink on the menu page, which communicates not only the request for the download but the IP address of the personal computer, as well as opening a socket for the data transmission. Alternatively, the user may select a menu option to have data transmitted by another method, such as in the form of attachments to e-mail sent to an address specified by the user in response to the menu.

Since sensitive data is stored on the server in encrypted format as received from the mobile handset, the personal computer must be configured with a decryption application in order to accomplish the file download. Therefore, the download-to-computer process may include downloading an application to the personal computer, step 892. This may be a single use application, such as a Java routine that operates within the web browser for the duration of the file download process before being deleted. Alternatively, the application may be stored in the personal computer for continued use, such as an application for routinely exchanging data between the personal computer and the mobile handset via the server. The application may also be loaded onto the personal computer from other storage means such as a compact disc in the manner of conventional software. Additionally, the software may have already been loaded onto the personal computer in a previous data downloading session. Therefore, the step of downloading the application to the personal computer, 892, is optional. Further, the server make query the personal computer to determine if the application software is already present, and download the application only if the personal computer has not already been configured.

With the personal computer configured to receive the data from the server, the server recalls the decrypting key stored in the database record associated with the mobile handset and transmits that decryption key to the personal computer, step 894. The application downloaded to the personal computer receives the decryption key and passes it to the decryption algorithm so that when data files are received the personal computer can decrypt the files appropriately. Additionally, the personal computer application may be configured to use the decryption key or authentication key to verify and authenticate data packages sent by the server using the MAC value transmitted along with the data packages as described above.

The server then transmits files to the personal computer using any of a number of data transfer protocols, step 896. For example, data files may be transmitted as Internet packet data, as attachments to electronic mail messages, and using the File Transfer Protocol (FTP). As each data packet is downloaded to the personal computer, the server also transmits a MAC or other authentication hash of the transmitted file, step 898, to enable the personal computer to verify and authenticate each data file using the associated MAC value. The server may wait for the personal computer to return an acknowledgement message indicating that a file was successfully downloaded prior to transmitting the next file. Once the file download is completed, the personal computer can decrypt the data files and store them in memory and disconnect from the server. The personal computer may also delete the decryption key from memory.

In an optional embodiment, the mobile handset and the server can be configured to backup mobile handset data files to the server. In this embodiment, illustrated in FIG. 16, the same basic steps for encrypting and transmitting data files to the server are employed; however, the data files on the mobile handset are not left in an encrypted format or deleted from memory. To begin the data file backup procedure, the mobile handset may receive a backup process activation command message from the server such as in the form of an SMS message, step 90. This SMS message may be received in a manner similar to that described the above with reference to FIG. 2. The mobile handset then obtains an encryption key to be used for encrypting data files prior to transmission, step 91. Since the data files must be transmitted from the mobile handset via a cellular telephone network, it is desirable to encrypt the files prior to transmission even though the files will not be left in an encrypted format in the mobile handset memory. The mobile handset can obtain the encryption key using any of the methods described above with reference to FIGS. 3A-3C.

The mobile handset establishes a data link to the server via the cellular telephone network, step 92. As with other methods described herein, this data link may be established using any available wireless system and data transmission protocol available. For example, the mobile handset may place a data call to an Internet access portal and then contact the server by accessing the server's IP address. With the data link establish, the mobile handset sequentially transmits data files to the server. This transmission of data files may take place in any order or as a single concatenated data file. In the example process illustrated in FIG. 16, the mobile handset sequentially selects a data file for transmission, step 93, encrypts the selected data file, step 94, generates an authentication hash or MAC for the encrypted file, step 95, and transmits the selected data file and its associated MAC to the server, step 96. When the last data file has been transmitted, test 97, the mobile handset deletes the encryption key from memory, step 98, and may inform the server and/or the user that the files have been successfully backed up, step 60.

Figure 16:
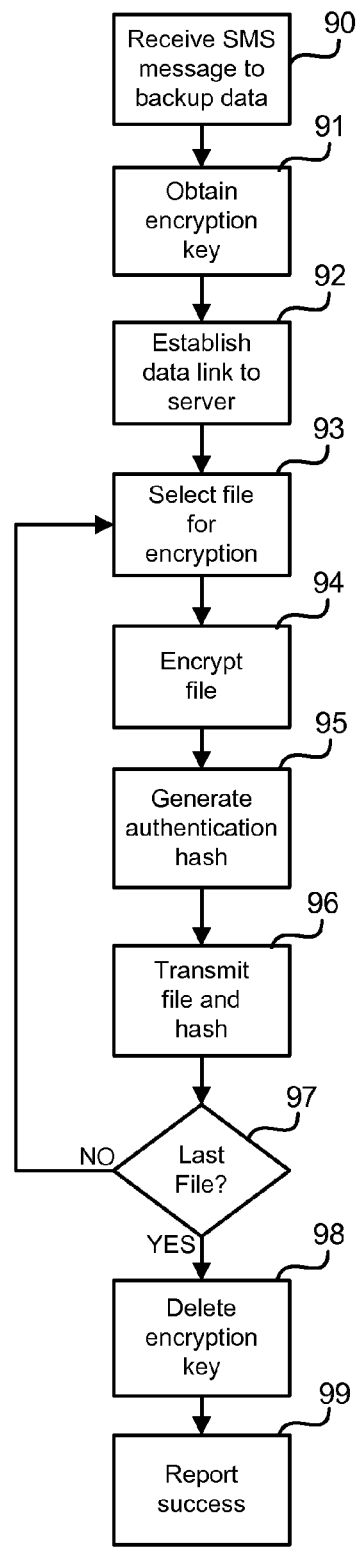
FIG. 16 is a process flow diagram of an embodiment method implemented on a mobile handset for backing up data files to a server.

In the foregoing description, the data files are encrypted and transmitted sequentially. However, all of the data files may be encrypted and stored prior to the mobile handset establishing the data communications link with the server. Thus, the order of steps illustrated in FIG. 16 is but one example of how the data backup process may be accomplished.

Figure 17:
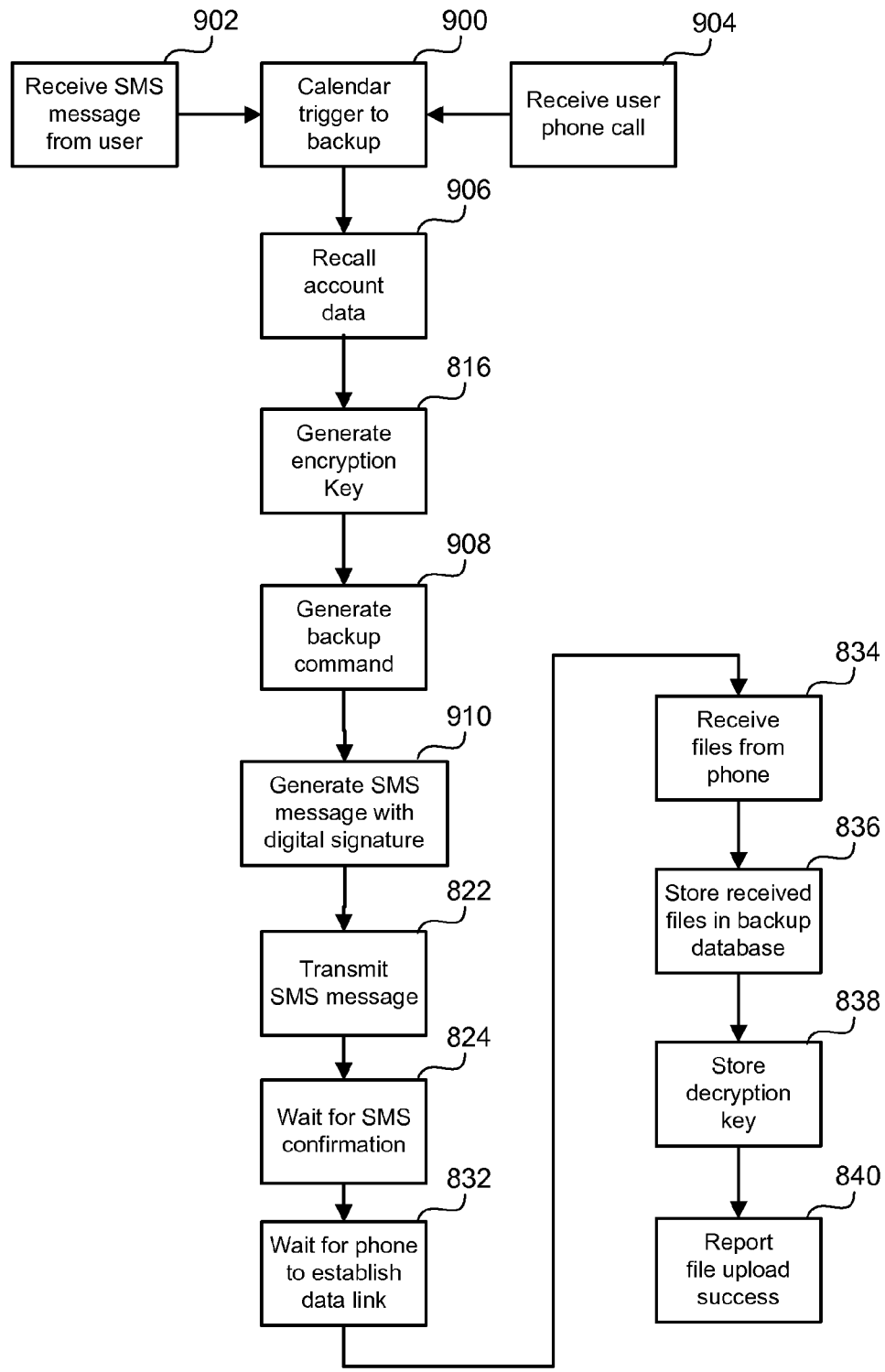
FIG. 17 is a process flow diagram of an embodiment method implemented on a server for directing a mobile handset to back up data files to the server.

On the server side, the backup process proceeds as illustrated in FIG. 17. A data backup session may be initiated by any of a number of events, three of which are illustrated in FIG. 17. For example, the server may be configured by the user, such as in response to menu options presented in a webpage posted by the server, to periodically backup data on the mobile handset. This may be accomplished, for example, by setting a scheduled backup interval (i.e., an amount of time between backup operations), selecting calendar dates for accomplishing backups, or setting a time of day and/or day of week for backing up mobile handset data. Alternatively, the backup procedure may be set to perform the procedure upon every power up. If so configured, the server will trigger itself to initiate a backup based upon a calendar, time or start up event, step 900. Similarly, the user may access the server using a computer coupled to the Internet and set the backup time to the present time to initiate an immediate backup of mobile handset data.

Alternatively, the user may request a backup to be conducted. The user may make such a request through any communication means with the server. For example, the user may send an SMS message to the server from a cellular telephone, step 902, or call a voice prompt service coupled to the server to request the backup by selecting a particular option, step 904.

Once the data mobile handset backup process has been initiated, the server may recall the account data from a database correlated to mobile handset accounts, step 906. This database includes the telephone number of the mobile handset and shared encryption keys that may be used for encryption and authentication purposes. The server may generate an encryption key for use by the mobile handset, step 816. Alternatively, the mobile handset may be instructed to generate a random encryption key on its own and communicate that key to the server as described above with reference to FIG. 3B. Thus, step 816 is optional. The server also generates the backup activation command, which may include providing option data to identify particular files or file types to be backed up by the mobile handset, step 908. Using the encryption key and the backup activation command and associated data, the server generates an SMS message and includes a digital signature, step 910. The format and generation of the SMS message (or any other type of message used) are described above with reference to other embodiments. The server then transmits the SMS message to the mobile handset, step 822, and waits to receive the acknowledgement message, step 824. If the activation message is not acknowledged within a predetermined amount of time, the server may retransmit the message.

Having requested activation of the mobile handset data backup procedure, the server waits for the mobile handset to establish a data link to the server, step 832. When that data link is established, the server and mobile handset negotiate a data transfer protocol after which the server receives the data files from the mobile handset, step 834. As data files are received by the server, they are stored in a backup database that is correlated to the mobile handset account number or other identifier, step 836. This database may include a large number of files that are indexed and keyed to an identifier of the mobile handset stored in the database of mobile handset accounts. In this fashion, the server can recall backup data by accessing all data that is indexed or otherwise linked to a particular mobile handset account number. The server also saves the decryption or encryption key required to read the stored data files, step 838. The decryption key may be stored in the database of mobile handset accounts so that the encrypted data files are maintained in a different file location from the decryption key necessary to access those files. Finally, the server may report successful backup of mobile handset data to a user, such as by sending an e-mail or SMS message or similar message to the user, step 840.

In a further embodiment, the mobile handset may be configured with software to initiate a data protection and backup procedure based upon an internal event (i.e., a condition or event determined by the mobile handset without prompting by an activation command message). For example, the mobile handset may be configured to protect personal data and initiate a data backup in the event that there has been no activity on the device for a preset period of time, such as a week or more. In this case, the internal event is the passage of predetermined amount of time without handset utilization. This embodiment is provided to address the case where a mobile handset is misplaced or stolen but not missed for a period of time. Additionally, this embodiment may function even if the mobile handset has been disconnected from the cellular telephone network, such as by having its transceiver turned off. Also, this embodiment would function if the mobile handset had been off for an extended period of time and then is turned back on, even if the transceiver is not turned on.

As another example, the mobile handset may initiate the data backup process upon being turned on, in which case the internal event is the power up sequence. This embodiment ensures that data on the mobile handset is routinely backed up without setting an option on the server.

As another example, the mobile handset may initiate the data backup process upon the battery level falling before a pre-set minimum. This embodiment ensures that data on a lost mobile handset is backed up before the battery is exhausted.

As another example, the mobile handset may initiate the data encryption and backup process upon detecting that the mobile handset has left a predetermined boundary or region. This embodiment ensures that data on the mobile handset is backed up in the event the handset is stolen and taken out of the area. The mobile handset can determine its location by receiving coordinate information from an internal Global Positioning System (GPS) receiver, or from the cellular telephone based locating service such as any of the Advanced Forward Link Trilateration (AFLT), Enhanced Forward Link Trilateration (EFLT), Enhanced Observed Time Difference of Arrival (EOTD) systems, or even initiation of roaming service. Such location information can be compared to preset conditions established by the user, such as in an application set up or initialization routine. In so doing, the user may also designate what should be done in the event is internal event is detected. For example, the user may designate that files are to be encrypted to protect them from misappropriation on the assumption that the phone has been stolen. Further, the user may designate that files are to be downloaded (backed up to the server) to protect them from being lost. Even further, the user may designate that files are to be deleted from the handset once they have been downloaded to the server. Activation of these alternatives may also depend upon geographic boundaries, such as triggering encryption upon the mobile handset traveling outside a 100 mile radius and deleting files if it travels more than 1000 miles.

As another example, the mobile handset may initiate the data encryption and backup process upon detecting that the user is not able to authenticate himself/herself to the mobile handset, signifying that an unauthorized person is trying to use the handset. As is well known, many mobile handsets can be configured (e.g., by selecting a configuration option) to require a user to authenticate himself/herself to the mobile handset, such as by entry of a user's password or personal identification number (PIN), in order to deny unauthorized users access to applications (e.g., calendar, phone book, etc.) and cellular telephone functionality. Typically the user is allowed an unlimited number of authentication attempts, such as opportunities to reenter the PIN or password, since the mobile handset has no other effective alternative. In this embodiment, however, the mobile handset may count the number of authentication retries and when the number of retries exceeds a threshold, initiate the data encryption and backup process. To do this, the mobile handset maintains a counter of authentication retries that is incremented each time an authentication attempt is unsuccessful (e.g., entry of an incorrect PIN or password). Once the user is authenticated, this counter may be reset. However, the authentication retry counter exceeding a threshold (which may be set by the user) is an internal event that can be used to trigger the data encryption, backup and (if so configured by the user) deletion. In order to avoid tipping off the user, the data encryption, backup and (optionally) deletion process may be executed while the user is allowed to continue entering a PIN or password, for example, so that the mobile handset continues to function in the expected manner. The method of user authentication is not limited to PIN or password entry, and may include biometric authentication (e.g., swiping a finger over a fingerprint scanner) as well as any other method for authenticating a user that is known or will be developed in the future. It is worth noting that this embodiment also allows a user to execute the encryption and backup process even when the user has forgotten or doesn't have access to the PIN or password for the mobile handset.

Figure 18:
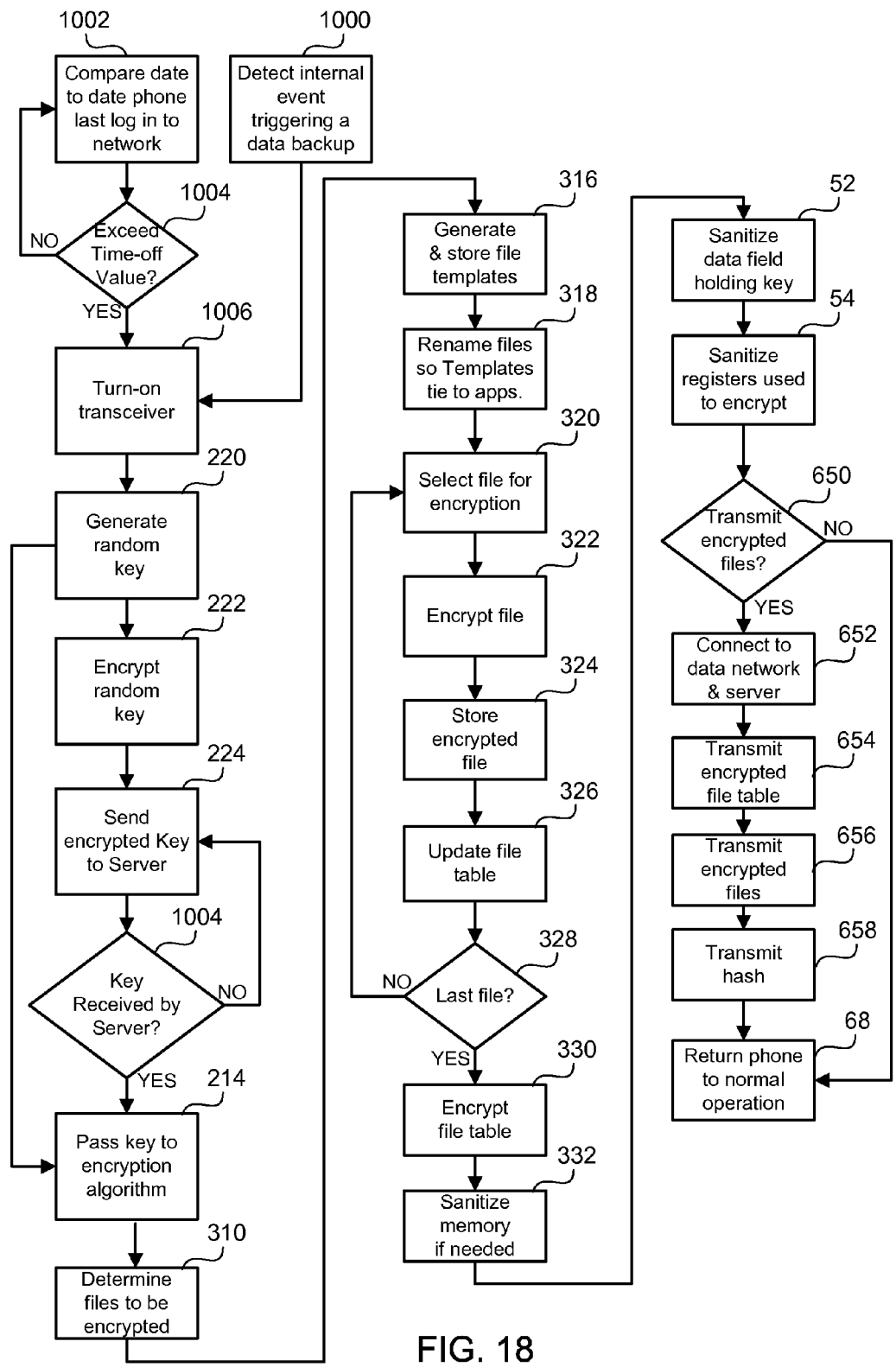
FIG. 18 is a process flow diagram of a process implemented on a mobile handset to backup data files to a server without activation by the server.

Referring to FIG. 18, an internal event, such as authentication retries exceeding a threshold, the mobile handset traveling beyond a preset boundary, startup or a low battery condition, may initiate the protection and backup process, step 1000. Such internal event triggers and associated threshold values may be established and configured by the user, such as in response to menu prompts presented on the mobile handset display by an application. If the internal event is a passage of time since the last use of the mobile handset, the protection and backup process may be initiated when an internal timer or calendar is compared to the date and time of the last login of the mobile handset to a cellular telephone network, step 1002. If this comparison shows that the preset time has not been exceeded, test 1004, the mobile handset may continue to monitor the date until such time as the time limit is exceeded.

If the time limit is exceeded (test 1004) or an internal event requires an immediate backup of data (step 1000), the mobile handset may turn on the transceiver if necessary to establish a link to the cellular telephone network, step 1006. As part of this step, the mobile handset may send a message to the server to let the server know that a data backup is about to be accomplished. As with other data protection method embodiments, the self initiated process may also configure the mobile handset so that there are no outwardly visible signs that the encryption and backup process has been initiated. If a connection to the cellular telephone network is not possible, the process may continue up to a point where data is encrypted but prior to deletion of the encryption key or instead use the failsafe encryption key recalled from memory to encrypt data and then delete the failsafe encryption key since the server maintains a copy of each failsafe encryption key.

Since this process may be initiated without direction from the server, the mobile handset may generate its own random encryption key, step 220, or obtain the failsafe encryption key from memory. If there is a connection established to the cellular telephone network, the mobile handset may encrypt the generated random encryption key, step 222, and send the encryption key to the server, step 224. The mobile handset may monitor for receipt of an acknowledgement message from the server indicating that the encrypting key has been received, step 1014, and retransmit the encryption key to the server, step 224, until it receives confirmation that the key has been delivered to the server. The mobile handset may be configured to wait for the server to receive the encryption key before proceeding, or to proceed to encrypt files even if it has no confirmation that the server has received the encryption key. Either way, the generated encryption key is passed to the encryption algorithm, step 214.

The mobile handset determines the files that are to be encrypted, such as by obtaining this information from memory, step 310. The file or file types may be selected by a user in advance and stored as application parameters in memory for use in this process. For example, a user may configure the mobile handset, such as by making selections in response to a user interface menu displayed on the mobile handset by an application, to encrypt address files, phone logs, electronic mail records, and stored SMS messages in the event of a self initiated protection and backup procedure. Additionally, a user may configure the mobile handset to encrypt all text and spreadsheet documents stored in memory, such as based on file extensions. Based upon the pre-selected options, the mobile handset reviews the data files stored in memory and prepares an index or a list of data files to be encrypted. In the pre-selected options, the owner of the mobile handset may designate different data for encryption depending upon the particular internal event that triggered the process. For example, if the internal event was the authentication retry counter exceeding a threshold, which may be assumed to indicate the mobile handset has been stolen, the owner may designate that all data files are to be encrypted, backed up and deleted, whereas if the internal event is low battery or startup, the owner may designate that only important confidential files be encrypted and backed up.

The mobile handset may also generate and store mock data files or templates, step 316, and rename the data files and templates, step 318, so as to ensure that mobile handset applications continue to function after the encryption procedure, step 316. The methods for generating, renaming and storing mock data files described above with reference to FIGS. 4 and 5 may be employed in this embodiment as well.

With data files renamed and replaced with mock data files in the file location table, the mobile handset can begin the process of encrypting the selected files. In a process similar to that described in further detail above with reference to FIG. 4, the mobile handset selects a file for encryption, step 320, encrypts that file using the generated encrypt key, step 322, stores the encrypted file in memory, step 324, and updates the file location table, step 326. This process is repeated until the last selected file has been encrypted, test 328. A special file location table including the file locations of all of the encrypted files may be assembled and encrypted, step 330. Memory locations that retain the non-encrypted data may then be sanitized, step 332.

If the mobile handset has not received confirmation from the server that the encryption key has been received, the mobile handset may suspend the file protection process at this point until the server does acknowledge receipt of the encryption key. Doing so ensures that the encryption key required to decrypt the data files is not deleted from memory before it has been stored by the server. In this condition, the files have been deleted from the file location table and stored in encrypted format making them very difficult to access. Furthermore, the encryption key may be stored in a location not easily accessible to unauthorized users, such as in a password protected memory location. Thus, while the data is not completely secure since the encryption key remains on the mobile handset, the files would be difficult to decrypt and access, particularly without the use of sophisticated electronic equipment.

If and when the mobile handset confirms that the encryption key has been delivered to the server, the mobile handset deletes the encryption key and sanitize is data fields and registers that held the encryption key, steps 52 and 54.

Alternatively, if the mobile handset has not received confirmation from the server that the encryption key was received, the mobile handset may re-perform the encryption process using the failsafe encryption key recalled from memory, which then can be deleted from the mobile handset memory, steps 52 and 54.

If the mobile handset is able to communicate with the server, such as via the cellular telephone network, the mobile handset may continue the process of uploading encrypted data files to the server. In a process similar to that described in further detail above with reference to FIG. 8, the mobile handset determines whether encrypted files are to be transmitted to the server, step 650, and if so, establishes a data connection to the server using any of the methods described herein, step 652. Once a data link as been established and the data transfer protocol negotiated, the mobile handset transmits an encrypted file table, step 654, and encrypted files and their associated MAC values, steps 656, 658. Once all of the encrypted data files have been transmitted to the server, or if no encrypted files were to be transmitted, the mobile handset returns to its previous operating condition, step 68. Since the self initiated file encryption and backup process is most likely initiated when the mobile handset is in an idle condition, this step may include turning off the transceiver.

In the various embodiment processes described above, the server may maintain an up-to-the-minute status record data file indicating the time of each message sent and received and the corresponding status of the mobile handset. This state maybe very useful to a user, and may be made viewed on a web page that the user can access via the Internet. For example, the user may log in to the server and select from the menu page an option to view the current status of the mobile handset, following procedures described above with reference to FIG. 11. The server then can recall data from the status record data file and a present this information in a web page.

The various embodiments may be implemented on any of a variety of mobile handsets, such as, for example, cellular telephones, personal data assistance (PDS) with cellular telephone or WiFi capability, mobile electronic mail receivers, mobile web access devices, and other processor equipped devices that may be developed in the future for storing personal data and connecting to a wireless network. Typically, such mobile handsets will have in common the component's illustrated in FIG. 19. For example, the mobile handset 1100 may include a processor 1102 coupled to internal memory 1104 and a display 1106. Additionally, the mobile handset 1100 will have an antenna 1110 for sending and receiving electromagnetic radiation that is connected to a transceiver 1112 coupled to the processor 1102. Additionally, the mobile handset 1100 may include a GPS receiver 1130 coupled to the antenna 1110 and to the processor 1102 for providing GPS coordinate information. The processor 1102 may be any programmable micro processor, microcomputer or multiple processor chips that can be configured by software instructions to perform a variety of functions, including the functions of the various embodiments. Typically, software applications may be stored on internal memory 1104 before they are accessed and loaded into the processor 1102. In some mobile handsets, the processor 1102 may include internal memory sufficient to store the application software instructions. User data files are typically stored in the memory 1104. In many mobile handsets, the memory 1104 is volatile or nonvolatile memory, such as flash memory. More recently, mobile handsets have begun to include miniature hard disk memory 1108 which is capable of storing several gigabytes of information. Mobile handsets may also it include a key pad 1120 or miniature keyboard and menu selection buttons or rocker switches 1122.

The various embodiments described above are implemented on a typical mobile handset 1100 by storing an application in memory 1104, 1108 which comprises processor executable software instructions that will cause the processor to execute the embodiment methods described herein.

Figure 19:
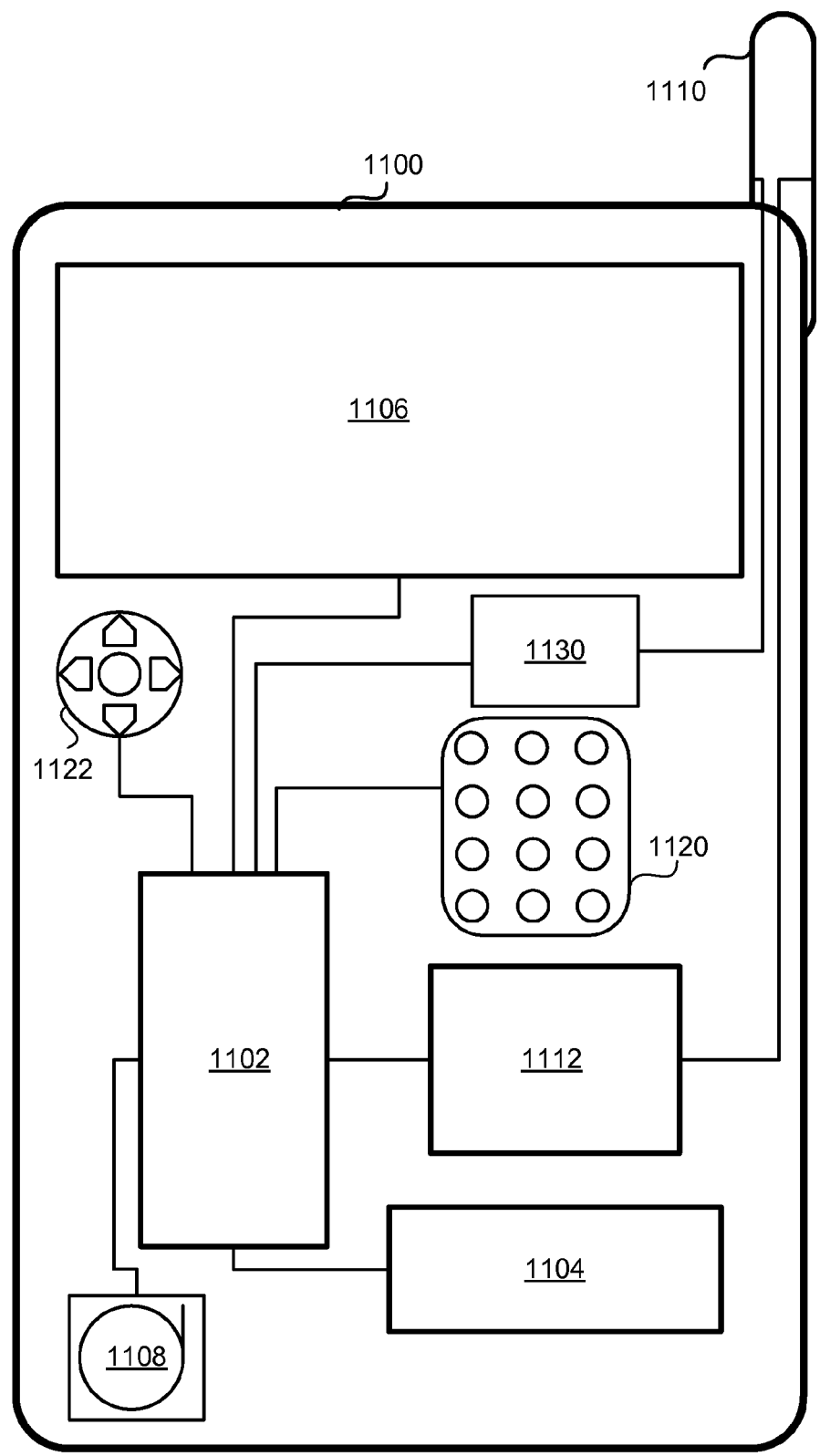
FIG. 19 is a circuit block diagram of an example mobile handset.
Figure 20:
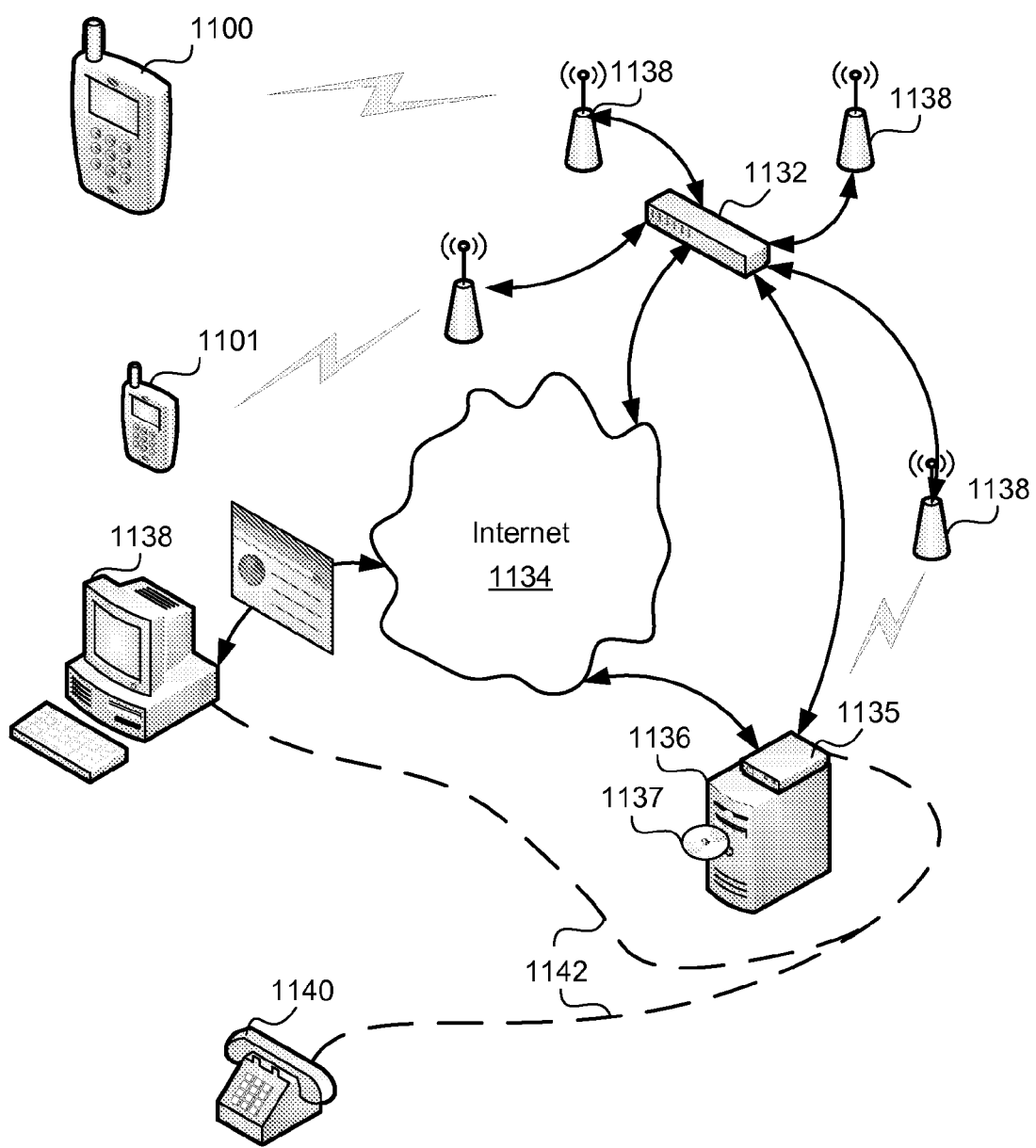
FIG. 20 is a system element diagram of a system suitable for implementing the various embodiments.

Mobile devices 1100 such as illustrated in FIG. 19 configured for the data encryption, backup and restoration functionality may be used in conjunction with the system illustrated in FIG. 20. This system includes a wireless communication network, such as a cellular telephone network including wireless transceivers 1100, such as cellular telephone transmission towers, and their physical communication network 1132 (which may partially include the ordinary telephone network) for transmitting communications between wireless transceivers 1100, other telephones and modems (e.g., a modem 1135 coupled to the server 1136), and the Internet 1134. Since the details of the cellular telephone network and WiFi wireless data networks are well known, further explanation of these networks is unnecessary.

The system also includes a server 1136 which is coupled to the Internet 1134. The server 1136 may also include a modem 1135 for receiving data calls via the telephone network 1142. In an embodiment, the modem 1135 (or other similar component) may include a cellular telephone transceiver for receiving and sending SMS messages directly via the nearest cell tower 1138 and the cellular telephone network 1132. Any commercially available server may be used for this process, which typically includes a processor or computer programmed with software that is coupled to a mass storage memory, such as a large hard disk memory or array of several hard disk drives. Being general purpose machines, the server 1136 is configured in the various embodiments by processor executable software operating in the server processor which may be stored on processor readable memory, such as a compact disc 1137. The software instructions used to configure the server 1136 will include standard Internet communication protocol applications which may be utilized by the various embodiments.

As described more fully above with reference to FIGS. 12-15 and 17, a user of the system can connect to the server 1136 through a variety of way, including for example: another mobile handset 1101 by SMS message or by accessing the Internet; a personal computer 1138 with a connection to the Internet 1134 or a dial up connection to a modem 1135 coupled to the server 1136; or by a telephone 1140 connected to the server 1136 or to a voice prompt menu system (not separately shown) coupled to the server 1136 via the ordinary telephone network 1142. It is worth noting that the voice prompt menu system may be incorporated as an application running within the server 1136 and does not necessarily need to be a separate device.

Figure 21:
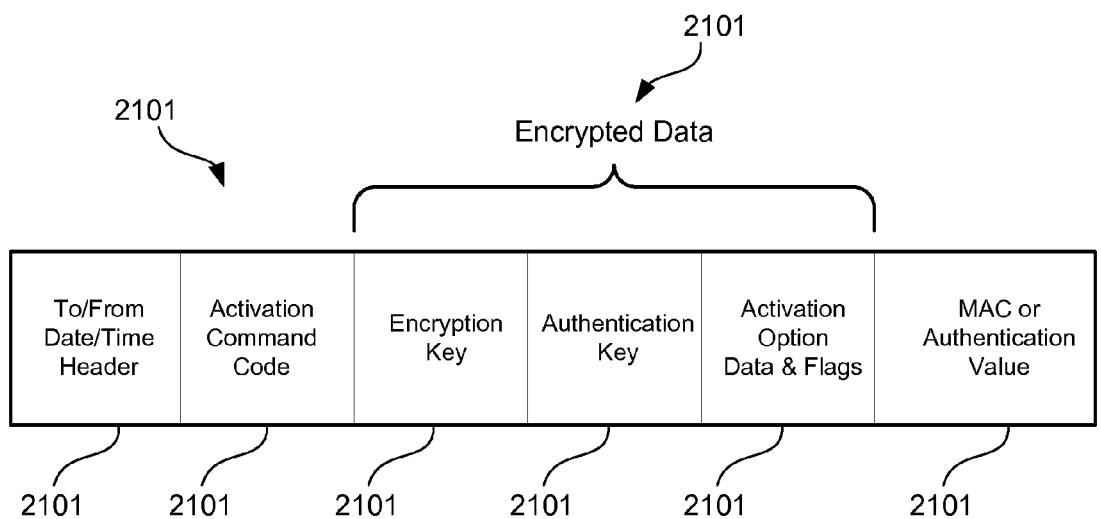
FIG. 21 illustrates elements of an embodiment activation message.

Several references are made herein to the use of an SMS message to carry the activation command from the server to the mobile handset. FIG. 21 illustrates one way in which an SMS message 2100 can be structured to support the various embodiments. The leading few data fields in the SMS message include message routing and source information 2101 that is necessary to ensure the message is properly routed by the system. Behind the header 2101 may be positioned a few bytes of data encoding the activation commands in an activation commander code field 2102. As described above, it may be desirable that the activation code be presented in the SMS message in a non-encrypted manner so that the message can be recognized by the mobile handset upon its reception. The activation command codes may be any recognizable patterns of bits that are not associated with other symbols or commands that would be recognized by the mobile handset.

The data payload portion of the SMS message may be used to carry the encrypted data 2103 needed by the mobile handset to execute the process being activated. This encrypted data payload 2103 may include the encryption key 2104, the message authentication key 2105, and option data and flags 2106 that may be used in the activated application. The encryption key 2104, authentication key 2105, and activation options 2106 may be assembled a gather and then encrypted as a group to create the encrypted data payload 2103. Finally, a message authentication code 2107, i.e., MAC, or similar hash of the entire SMS message content maybe generated and added to the SMS message as a final data field. This MAC serves as a digital signature on the message that allows the mobile handset to confirm the contents by using the included authentication key 2105.

The SMS message illustrated in FIG. 21 is provided merely as an example of one configuration for the activation command message. Those of skill in the art will appreciate that many different forms and formats of data messages may be used to transmit the activation commands and encryption keys. Therefore, the example illustrated in FIG. 21 is not intended to be limiting on the scope of the invention or the claims.

The hardware used to implement the events of the forgoing embodiments may be processing elements and memory elements configured to execute a set of instructions, wherein the set of instructions are for performing method steps corresponding to the above events. Alternatively, some steps or methods may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip in separate memory chips, and combination of different types of memory such as flash memory and RAM memory. References herein to the memory of a mobile device are intended to encompass any one or all memory modules within the mobile device without limitation to a particular configuration, type or packaging. An exemplary storage medium is coupled to a processor in either the mobile handset or the server such that the processor can read information from, and write information to, the storage medium. In the alternative, the storage medium may be integral to the processor. The processor and the storage medium may reside in an ASIC. The ASIC may reside in a user terminal. In the alternative, the server processor and the storage medium may reside as discrete components in a user terminal.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for securing data files on a mobile handset, comprising:
   receiving an activation command message via a wireless network directing the mobile handset to encrypt the data files;
   obtaining an encryption key upon recognizing the activation command message by:
      receiving a public key in the activation command message; and
      generating a symmetric key and encrypting it using the public key;
   encrypting the data files using the symmetric key to generate an encrypted data file;
   storing the encrypted data files in memory of the mobile handset;

transmitting the encrypted symmetric key to a server via the cellular telephone network; and deleting the symmetric key from a memory of the mobile handset after the data files have been encrypted.

2. The method of claim 1, wherein the activation command message is received in a payload of a Short Message Service (SMS) message.

3. A mobile handset, comprising:
a processor;
a wireless transceiver coupled to the processor and configured to connect to a wireless network; and
a memory coupled to the processor, the memory having stored therein software instructions configured to cause the processor to perform operations comprising:
   receiving an activation command message via the wireless network directing the mobile handset to encrypt data files;
   obtaining an encryption key upon recognizing the activation command message by:
      receiving a public key in the activation command message; and
      generating a symmetric key and encrypting it using the public key;
   encrypting the data files using the symmetric key;
   storing the encrypted data files in the memory;
   transmitting the encrypted symmetric key to a server via the cellular telephone network; and
   deleting the symmetric key from the memory after the data files have been encrypted.

4. The mobile handset of claim 2, wherein the software instructions in the memory are further configured to cause the processor to perform the operation of receiving the activation command message in a payload of a Short Message Service (SMS) message.

5. A mobile handset, comprising:
means for receiving an activation command message via a wireless network directing the mobile handset to encrypt data files;
means for obtaining an encryption key upon recognizing the activation command message comprising:
   means for receiving a public key in the activation command message; and
   means for generating a symmetric key and encrypting it using the public key;
means for encrypting the data files using the symmetric key;
means for storing the encrypted data files in a memory of the mobile handset;
means for transmitting the encrypted symmetric key to a server via the cellular telephone network; and
means for deleting the symmetric key from the memory of the mobile handset after the data files have been encrypted.

6. The mobile handset of claim 5, wherein the means for receiving the activation command message comprises means for receiving the activation command message in a payload of a Short Message Service (SMS) message.

7. A non-transitory, processor-readable storage medium having stored thereon processor executable software instructions configured to cause a processor of a mobile handset to perform operations comprising:
receiving an activation command message via a wireless network directing the mobile handset to encrypt data files;
obtaining an encryption key upon recognizing the activation command message by:
   receiving a public key in the activation command message; and
   generating a symmetric key and encrypting it using the public key;
encrypting the data files using the encryption key;
storing the encrypted data files in a memory of the mobile handset;
transmitting the encrypted symmetric key to a server via the cellular telephone network; and
deleting the encryption key from the memory of the mobile handset after the data files have been encrypted.

8. The non-transitory, processor-readable storage medium of claim 7, wherein the software instructions stored in the processor readable memory are further configured to cause the processor to perform the operation of receiving the activation command message in a payload of a Short Message Service (SMS) message.

* * * * *